United States Patent [19]

Mizoguchi et al.

[11] Patent Number: 5,450,436
[45] Date of Patent: Sep. 12, 1995

[54] LASER GAS REPLENISHING APPARATUS AND METHOD IN EXCIMER LASER SYSTEM

[75] Inventors: Hakaru Mizoguchi; Junichi Fujimoto; Masahiko Kowaka; Tomokazu Takahashi, all of Hiratsuka, Japan

[73] Assignee: Kabushiki Kaisha Komatsu Seisakusho, Tokyo, Japan

[21] Appl. No.: 154,531

[22] Filed: Nov. 19, 1993

[30] Foreign Application Priority Data

Nov. 20, 1992 [JP] Japan .................. 4-312202
Nov. 30, 1992 [JP] Japan .................. 4-320567
Dec. 4, 1992 [JP] Japan .................. 4-350674

[51] Int. Cl.$^6$ .................................. H01S 3/22
[52] U.S. Cl. .......................... 372/59; 372/57; 372/58
[58] Field of Search ............... 372/57, 59, 29, 32

[56] References Cited

U.S. PATENT DOCUMENTS

| | | | |
|---|---|---|---|
| 4,975,919 | 12/1990 | Amada et al. | 372/32 |
| 4,977,573 | 12/1990 | Bittenson et al. | 372/57 |
| 5,081,635 | 1/1992 | Wakabayashi et al. | 372/57 |
| 5,090,020 | 2/1992 | Bedwell | 372/57 |
| 5,099,491 | 3/1992 | Chaffee | 372/58 |
| 5,142,543 | 8/1992 | Wakabayashi et al. | 372/57 |
| 5,315,610 | 5/1994 | Alger et al. | 372/61 |

FOREIGN PATENT DOCUMENTS 3-231482 10/1991 Japan .
4-120782 4/1992 Japan .
4-137576 5/1992 Japan .
5-21868 1/1993 Japan .

OTHER PUBLICATIONS

"The 5th Generation in Excimer Lasers" catalog, pp. 1-23, 4-88 printed.
"Excimer Lasers w/Magnetic Switch Control" catalog, pp. 1-12 No month & year.
"SPIE Microlithography '93 San Jose" pp. 1-10 No month & year.

Primary Examiner—Leon Scott, Jr.
Attorney, Agent, or Firm—Diller, Ramik & Wight

[57] ABSTRACT

A laser system which realizes its stable operation. In the system, a spectrum width of laser light dischargingly excited in a laser chamber is detected by a spectrum width monitor. A controller controls, on the basis of the detected spectrum width, a replenishment amount of gas to be replenished from an F2 gas cylinder into the laser chamber through a sub-tank and on-off valves to cause the spectrum width to become constant.

Further, when replenishment of a halogen gas diluted with a buffer gas is carried out, a gas exhaustion step of keeping the internal total gas pressure of the laser chamber constant is omitted.

In addition, a laser oscillation pulse number is counted for a predetermined period of time and a replenishment amount of the halogen gas is carried out according to the count value.

31 Claims, 26 Drawing Sheets

LASER GAS REPLENISHING APPARATUS AND METHOD IN EXCIMER LASER SYSTEM

BACKGROUND OF THE INVENTION

1. Field of the Invention

The present invention relates to an excimer laser system which is used mainly as a light source of a demagnification projection aligner (which will be also referred to as the stepper, hereinafter) or a light source for processing materials and which oscillates laser through discharging excitation and more particularly, to an apparatus and method for replenishing a halogen gas into a laser chamber.

2. Description of the Related Art

When a discharging excited excimer laser system is operated with use of a laser gas containing a halogen gas, as the operating time of the laser system elapses, the material of discharging electrodes is evaporated and a chemical reaction takes place with the materials of other constituent parts, whereby the halogen gas is consumed. The consumption of the halogen gas results in that the output of the laser system is reduced.

In order to compensate for such a reduction in the laser output caused by the consumption of the halogen gas, replenishment of the halogen gas has conventionally been carried out in the following manner.

More in detail, in the case of a prior art excimer laser system, in order to excite the laser, electric energy accumulated in a capacitor of a charging circuit is provided to a discharging space within a laser chamber to activate a laser medium gas for its output. In this case, the output of the laser is increased by increasing the charging voltage of the capacitor. Accordingly, the laser output can be stabilized at a certain magnitude by detecting the laser output and controlling the charging voltage of the capacitor.

However, when the laser is operated for a long period of time, the oscillation efficiency is reduced along with the reduction of the halogen gas as mentioned above, which results in that the laser output cannot be maintained at a desired level so long as the charging voltage is not correspondingly increased gradually. Therefore, when the charging voltage is increased to such a predetermined threshold value that a reduction in the oscillation efficiency cannot be compensated for only by an increase in the charging voltage, a predetermined amount of halogen gas is supplied into the laser chamber.

A method of replenishing the halogen gas in the prior art technique will be explained by referring to FIGS. 17 to 19.

FIG. 17 shows an arrangement of a general fluorine-series excimer laser system associated with its gas supply. In this case, there are provided, as gas injection cylinders, a cylinder 8 filled with a halogen gas (such as F2) diluted with a buffer gas (such as Ne), a cylinder 9 filled with such a rare gas as Kr, and a cylinder 10 filled with such a buffer gas as Ne. When it is desired to inject gases prior to starting of the laser, on-off valves 11, 12 and 13 are controllably opened and closed to supply the gases to a laser chamber 4; while, when it is desired to replenish the laser chamber 4 with the halogen gas after operation of the laser, on-off valves 17 and 16 are controllably opened and closed to supply the halogen gas to the laser chamber 4 via a sub-tank 15.

When it is desired to newly inject the gases into the laser chamber 4 prior to the starting of the laser, first of all, old gases present within the laser chamber 4 are discharged by a vacuum pump 20 from the chamber 4 via an on-off valve 19. Subsequently, 40 Torr of Kr gas is charged from the gas cylinder 9 through the on-off valve 12 into the laser chamber 4, 80 Torr of F2 gas diluted with an Ne gas is charged from the gas cylinder 8 through the on-off valve 11 into the chamber 4, and then an Ne gas is charged from the gas cylinder 10 through the on-off valve 13 into the laser chamber 4 so that a total of gas pressure within the chamber 4 becomes 2500 Torr.

As a result of such gas injection control, the laser chamber 4 of the laser system has a partial pressure ratio F2:Kr:Ne of 4:40:2456 (Torr) or 0.16:1.60:98.24 (%).

After the laser chamber 4 is filled with such new gases, the operation of the laser system will be carried out in accordance with a flowchart of FIG. 18 showing how to control gas replenishment.

Prior to the operation of the excimer laser system, first, a target laser output Ec, an optimum control charging voltage range Vc (Vmin to Vmax), an increment/decrement charging voltage $\Delta V$ by one control operation, and a replenishment gas amount $\Delta G$ by one control operation are previously set (step 901).

When the laser system then starts its operation, a laser output E detected by a laser output monitor 6 as well as a charging voltage V detected by a charging voltage detector 24 are supplied to a controller 1 (step 902). The controller 1 compares the detected laser output E with the target laser output Ec (step 903), adds the aforementioned fine voltage $\Delta V$ to the detected charging voltage V so that the voltage V becomes a command charging voltage Va when E<Ec (step 904), uses the detected charging voltage V as the command charging voltage Va as it is when E=Ec (step 905), and subtracts the aforementioned fine voltage $\Delta V$ from the detected charging voltage V so that the voltage V becomes the command charging voltage Va when E>Ec (step 906).

Further, the controller 1 compares the command charging voltage Va with a maximum value Vmax within the optimum control charging voltage range Vc (step 907), and when Va$\leq$Vmax, returns to the step 902 to control the command voltage Va. When Va>Vmax, however, the controller 1 controls to cause the Ne gas containing the F2 gas to be replenished by the predetermined amount $\Delta G$ from the gas cylinder 8 to the laser chamber 4 (step 908) and at the same time, to cause the gas within the laser chamber 4 to be partly discharged so that the total gas pressure in the laser chamber 4 is kept at a predetermined level (step 909).

FIG. 19 is a timing chart for explaining the timing of the laser output E, command charging voltage Va, halogen gas (F2) partial pressure, rare gas (Kr) partial pressure under the above control. In the drawing, a time axis is represented by the number of shots of the laser. In part (b) of FIG. 19, time points t1 to t6 at which the charging voltage command Va to the capacitor abruptly drops, correspond to the gas replenishing timing of the halogen gas respectively.

In the aforementioned prior art, however, the gas cylinder 8 for replenishment of the halogen gas contains no rare gas component (Kr gas in the above example). In addition, the prior art controls to keep the total internal pressure of the laser chamber 4 constant by partly discharging the gas in the chamber 4 for each gas replenishment (step 909 in FIG. 18), which results in that, as the gas replenishment is frequently carried out, the rare gas (Kr) is gradually decreased as shown in part (d) of FIG. 19, and mere rough calculation shows that 10 times of gas replenishment leads to loss of 20% of Kr gas. In other words, this means that, as the gas replenishment is carried out, the halogen gas (F2) is gradually excessively supplied as shown in part (c) of FIG. 19. Further, even when one time of replenishment ΔG is set to be small so as to prevent excessive replenishment, the replenishment interval becomes gradually shorter as shown in part (c) of FIG. 19, which eventually leads to the change in the composition balance of gases. That is, in the prior art, each time the halogen gas is replenished, the optimum composition balance of the mixture gas in the laser chamber 4 is destroyed, which results in that, even the charging voltage to the capacitor is controlled, the laser output cannot be kept constant.

Furthermore, in the prior art, the gas replenishing time point is determined by the charging voltage comparison (step 907) independently of the optimum gas composition balance and the comparing time point of the charging voltage is based on the laser output comparison (step 903) also independently of the optimum gas composition balance. In particular, the laser output comparison, which is influenced by impurity gases generated within the laser chamber 4, the stain of optical elements thereof, etc., can have great effect on the charging voltage comparison. That is, the prior art gas replenishing method has had such a problem that such an indirect physical quantity as mentioned above is unnaturally used as a reference of deciding the gas replenishing time point, which unfavorably results in that the gas balance is destroyed by the above disturbances.

In the case of a demagnification projection aligner, there has been a problem that the spectrum width, which has a great influence on an imaging performance of a projection alignment lens, also changes along with the fluctuation of the laser gas composition.

Further, in the case of a narrow-band excimer laser used in the demagnification projection aligner, there has been a problem that, when the gas condition changes, the spectrum width becomes narrower as the number of operating shots increases. As shown in FIG. 6, each time the gas is replenished the spectrum width Δλ instantaneously becomes large and thus a stable spectrum width cannot be obtained.

On the other hand, in the case of an excimer laser system, the halogen decrease rate in the initial operating stage is usually unstable. This is because the temperatures of constituent parts of the laser including a laser chamber do not reach a stable level yet and the reaction rates of the halogen gas with the respective parts within the laser system are dependent on the temperatures. For this reason, the decrease rate of the halogen gas here is not a constant value.

SUMMARY OF THE INVENTION

In view of the above circumstances, it is a first object of the present invention to provide a laser system which suppresses fluctuations in the spectrum width caused by changes in the above gas composition and stabilizes the spectrum width at a constant value so as to stabilize the output of the laser system.

A second object of the present invention is to provide a laser system which realizes gas replenishment while preventing destruction of an optimum gas composition balance even when the gas replenishment is carried out for a number of times and thus stabilizes the output of the laser system.

A third object of the present invention is to provide a laser system which determines an optimum gas replenishment amount according to the decrease rate of a halogen gas and supplies the optimum replenishment amount to thereby stabilize the output of the laser system, no matter how much the decrease rate of the halogen gas varies during operation.

In accordance with a first aspect of the present invention, there is provided an excimer laser system in which a laser gas containing a halogen gas is sealed within a laser chamber and excited by discharging within the laser chamber to thereby output a laser oscillation light having a predetermined spectrum width, and which comprises means for replenishing the halogen gas into the laser chamber, means for detecting a spectrum width of the laser oscillation light, and means for controlling the replenishment amount of the halogen gas to be replenished by the replenishment means on the basis of the spectrum width detected by the detection means to cause the laser oscillation light to have the predetermined spectrum width.

It has been found from tests by the inventors of the present invention that there is such a certain relationship as shown in FIG. 7 between the partial pressure of halogen gas (fluorine) and the spectrum width.

This is considered due to the fact that a laser gain region formed by the discharging is varied by the gas composition, which eventually results in that the spectrum width is also varied. Therefore, it will be appreciated that, when the partial pressure of the fluorine gas, i.e., the replenishment amount of the halogen gas is controlled according to the spectrum width on the basis of the predetermined relationship between the spectrum width and fluorine partial pressure, a desired spectrum width can be obtained.

Further, the laser output is also dependent on the fluorine partial pressure as shown in FIG. 8. However, the output can be adjusted by controlling the power supply voltage and when the laser is operated in such a maximum zone (about 0.08–0.5% in the test conditions) that the partial pressure less affects the output, the influence of the fluorine partial pressure can be suppressed to a negligible extent.

As has been mentioned, the first invention is directed to change, according to the detected value of the spectrum width, the replenishment amount of halogen gas which is replenished for compensating for the output reduction caused by the consumption of the halogen gas to obtain an optimum replenishment amount, thereby suppressing fluctuations in the spectrum width and attaining a stable laser output.

In accordance with a second aspect of the present invention, there is provided a gas replenishment method in an excimer laser system wherein at least one kind of a halogen gas, a rare gas and a buffer gas is injected into a laser chamber to provide laser oscillation, and wherein a gas exhaustion step of keeping constant the internal total gas pressure of the laser chamber is omitted at the time of replenishing the halogen gas diluted with the buffer gas.

In the second invention, since the gas exhaustion step is removed, the total gas pressure is increased. However, a molecule number density is kept constant even though the rare gas component per unit volume increases as a result of the replenishment of halogen gas and thus reduction of the laser output can be made small.

In accordance with a third aspect of the present invention, there is provided a gas replenishment method in an excimer laser system wherein a halogen gas, a rare gas and a buffer gas are injected into a laser chamber to provide laser oscillation, and which comprises a step of exhausting gas for keeping constant the internal total gas pressure of the laser chamber when replenishing the halogen gas diluted by the buffer gas and a step of replenishing the rare gas.

In the third invention, the rare gas component diluted by the gas exhaustion step at the time of replenishing the diluted halogen gas is compensated for by performing the rare gas replenishment step.

In accordance with a fourth aspect of the present invention, there is provided a laser gas replenishment method in an excimer laser system wherein a halogen gas, a rare gas and a buffer gas are injected into a laser chamber to provide laser oscillation, and which comprises a step of counting the number of laser oscillation pulses for a predetermined period of time and a step of replenishing an amount of the halogen gas corresponding to the count value.

In the fourth embodiment, in a laser chamber having a laser material gas sufficiently examined and sufficiently passivated, even though a bit of variation exists in the consumption amount of halogen gas at the starting stage, the number of laser oscillation pulses (discharging frequency) is substantially proportional to the amount of halogen molecules reduced in a constant halogen molecule number density. Accordingly, the reduced amount of the halogen gas can be found by counting the laser oscillation pulse number and an optimum amount corresponding to the reduced amount can be replenished.

DESCRIPTION OF THE PREFERRED EMBODIMENTS

Laser gas replenishing apparatus and methods in excimer laser systems in accordance with embodiments of the present invention will be explained with reference to the accompanying drawings.

EMBODIMENT 1

(In the Case of Demagnification Projection Alignment Excimer Laser)

Figure 1:
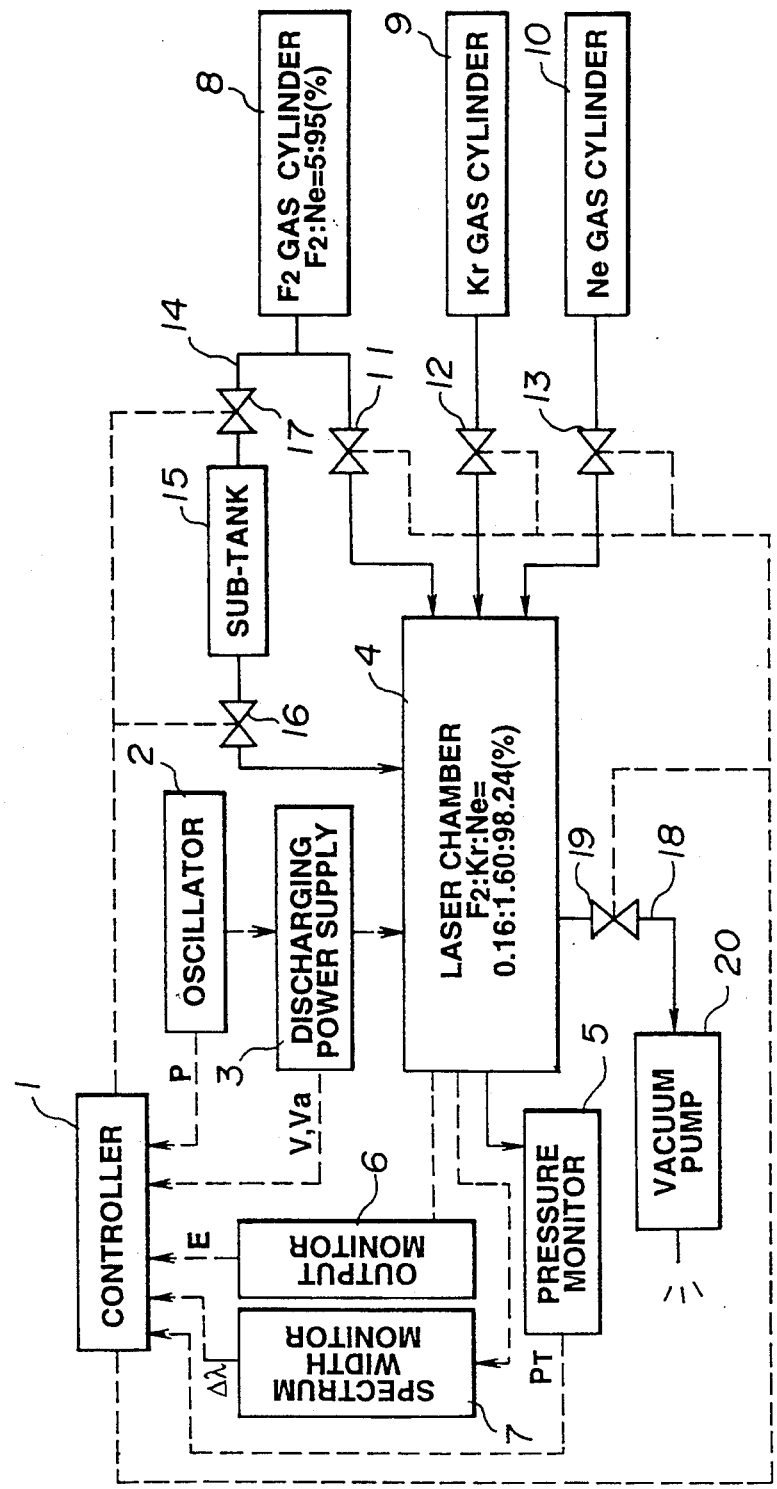
FIG. 1 is a block diagram of an arrangement of a laser gas replenishing apparatus in an excimer laser system in accordance with a first embodiment of the present invention.
Figure 2:
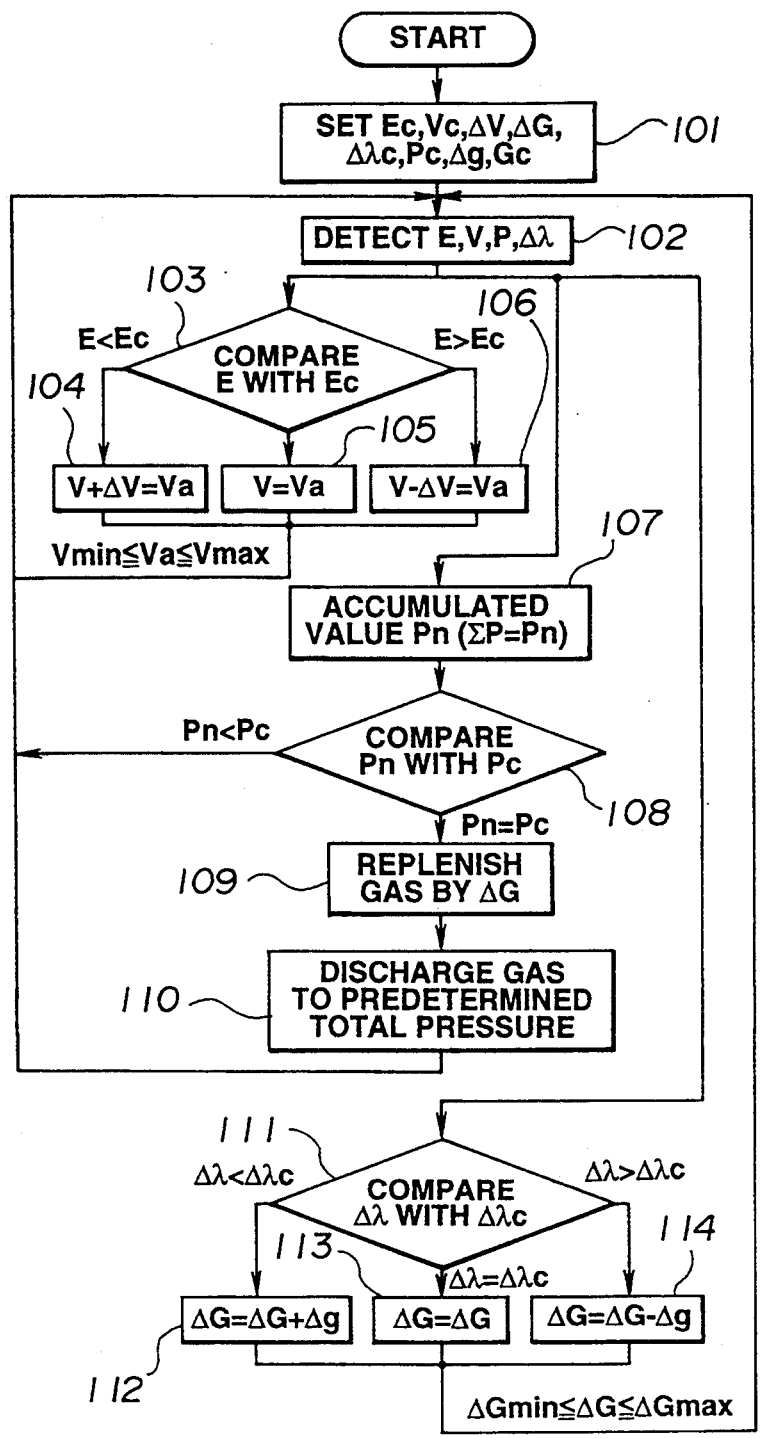
FIG. 2 is a flowchart for explaining the procedure of gas replenishing processes carried out in the system of the first embodiment of FIG. 1.

FIG. 1 shows a block diagram of an arrangement of a system in accordance with a first embodiment of the present invention, and FIG. 2 is a flowchart for explaining the procedure of gas replenishing processes carried out in the system of the first embodiment of FIG. 1.

First, explanation will be made as to a gas injection circuit in the laser system of FIG. 1. The illustrated gas injection circuit includes a gas cylinder 8 filled with such a halogen gas as F2 or HCL diluted with such a buffer gas as Ne or He, a gas cylinder 9 filled with such a rare gas as Kr, Xe or Ar, a gas cylinder 10 filled with such buffer gas as Ne or He, and on-off valves 11, 12 and 13 disposed on respective gas supply lines from the respective gas cylinders 8, 9 and 10 to a laser chamber 4.

The laser system of FIG. 1 is supposed to be a so-called fluorine-series gas excimer laser system in which the gas cylinder 8 is filled with a mixture of F2 and Ne gases at a gas partial pressure ratio F2:Ne of 5:95 (%), the gas cylinder 9 is filled with a Kr gas, and the gas cylinder 10 is filled with an Ne gas. In this connection, the gas cylinders 9 and 10 may be combined into a single gas cylinder in which rare and buffer gasses are previously mixed at a predetermined composition ratio.

Although it is assumed that the Ne gas is used as the buffer gas, an He gas may be employed in place of the Ne gas or a mixture of the Ne and He gases blended at a desired ratio may be used as the buffer gas.

A gas replenishing circuit in the system of the embodiment is made up of the aforementioned gas cylinder 8 and the on-off valves for replenishment of various sorts of gases disposed on the gas supply line 14 connected between the gas cylinder 8 and the laser chamber 4. For simplification of explanation, the illustrated gas replenishing circuit includes a sub-tank 15, and on-off valves 16 and 17 connected in series as respectively disposed downstream and upstream of the sub-tank 15, but in practical applications, the gas replenishing circuit includes, in addition to the above, not illustrated various fine-flow control valves.

A gas discharging circuit in the system of the embodiment includes a vacuum pump 20 and a laser chamber gas discharging valve 19 disposed on a gas discharge line 18 from the laser chamber 4 to the vacuum pump 20.

Data relating to the timing of injection of various sorts of gases, the timing of replenishment of the halogen gas, the amount of replenishment of the halogen gas, etc. are applied to a controller 1 by means of an input means (not shown).

An oscillator 2 for pulse oscillation outputs an oscillation signal to a discharging power supply 3. The discharging power supply 3 is used to provide discharge between two electrodes located within the laser chamber 4 according to the oscillation signal output from the oscillator 2, whereby the charging circuit once performs its charging operation with a voltage corresponding to a command charging voltage Va output from the controller 1 and performs its discharging operation, for example, through the operation of such a switching element as a thyratron. A charging voltage V in the discharging power supply 3 is detected by a predetermined sensor and applied therefrom to the controller 1.

In the laser chamber 4, when discharging is carried out and a laser gas therein is excited, laser oscillation takes place and the oscillated laser light is resonated within an optical resonator including optical narrowing components, so that an output is issued from a front mirror as an effective oscillation laser light. In this conjunction, the discharging is carried out with a predetermined pulse width and a predetermined interval, and the laser light is intermittently output.

The laser light thus oscillated is projected to an output monitor 6 which in turn detects energy E (which will be referred to as the laser output E, hereinafter) of the received output laser light. The detected laser output E is applied from the output monitor 6 to the controller 1.

A spectrum width monitor 7, which is a wavelength linewidth sensor comprising as its main constituent element an etalon (monitor etalon) for wavelength detection or a diffraction grating type spectroscope, detects a spectrum width $\Delta\lambda$ of the oscillated laser light and applies it to the controller 1.

A pressure monitor 5 is a sensor for detecting a pressure $P_T$ (total pressure) of the gases within the laser chamber 4 and applies the detected pressure $P_T$ to the controller 1. Each time the oscillation signal is output from the oscillator 2, a signal P indicative of oscillation of one pulse is applied from the oscillator 2 to the controller 1.

The controller 1, on the basis of the outputs of these monitors 2, 3, 6 and 7, calculates the command charging voltage Va (which will be described later), outputs the voltage Va to the discharging power supply 3 to control the discharging voltage of the power supply, and also controls, on the basis of the output of the pressure monitor 5, the opening and closing operation of the valves 14, 16 and 19 so that, when gas is discharged from the laser chamber 4 when a halogen gas is replenished (which will be described later), the pressure within the laser chamber 4 is kept at a predetermined constant level. When gases are replenished, i.e., when various sorts of new gases are injected into the laser chamber 4 from the associated gas cylinders 8, 9 and 10 prior to the operation of the laser system, the controller 1 acts to suitably control the opening and closing operation of the valves 11, 12 and 13 in such a manner that a gas composition of gases in the laser chamber 4 becomes a predetermined ratio.

The gas injection is carried out according to the following procedure.

That is, prior to starting the operation of the laser system, the old gases within the laser chamber 4 are first exhausted by the aforementioned gas exhaustion circuit.

And 40 Torr of Kr gas is charged into the laser chamber 4 from the Kr gas cylinder 9, 80 Torr of F2 gas (diluted with the Ne gas as mentioned above) is charged from the gas cylinder 8 into the laser chamber 4, and then the Ne gas is charged into the laser chamber 4 from the gas cylinder 10 so that the laser chamber 4 has a total gas pressure of 2500 Torr. In the present embodiment, the gas composition partial pressure ratio F2:Kr:Ne within the laser chamber 4 is 4:40:2456 (Torr) or 0.16:1.60:98.24 (%). When the respective gases are charged into the laser chamber 4 from the respective gas cylinders 8, 9 and 10, the controller 1 controls the opening and closing operation of the respective on-off valves 11, 12 and 13 in such a manner that the internal pressure of the chamber 4 becomes the aforementioned predetermined level of 2500 Torr.

As the excimer laser system is continuously operated as mentioned above, the halogen gas is consumed with passage of the operational time and the output of the laser system is reduced. Since the laser output is obtained by providing the electric energy charged in the capacitor to the discharging space to activate the laser medium gas and excite the laser, the laser output can be changed by controlling the charging voltage Va to the capacitor. That is, even when the halogen gas is consumed, the laser output can be kept constant by increasing the charging voltage Va to the capacitor by an amount corresponding to a reduction in the output caused by the gas consumption.

In the present embodiment, to this end, an optimum control charging voltage range Vc (Vmin to Vmax) for the charging voltage Va is previously set so that, when the charging voltage Va exceeds the range or when Va>Vmax, the controller 1 issues an alarm signal indicative of the necessity of gas replacement.

The timing and amount of the gas replenishment are determined by data entered through the input means as mentioned above, the gas replenishment is carried out through the aforementioned gas replenishment circuit. Whenever the gas replenishment is carried out, the gas within the laser chamber 4 is partly exhausted through the above gas exhaustion circuit so that the total pressure of the laser chamber is kept at the predetermined level.

FIG. 2 is a flowchart showing the procedure of such replenishing operation. A target laser output Ec, an optimum control charging voltage range Vc (Vmin to Vmax), a command charging voltage increment/decrement $\Delta V$ (absolute value), a replenishment gas amount $\Delta G$ (initial value) for one operation, a target spectrum width $\Delta \lambda c$, a pulse number threshold value $P_c$, an optimum control gas replenishment amount range $\Delta Gc$ ($\Delta Gmin$ to $\Delta Gmax$), and a replenishment gas increment/decrement $\Delta g$ (absolute value) are previously set on the basis of input data (step 101). When these set values Ec, Vc, $\Delta V$, $\Delta G$, $\Delta \lambda c$, $\Delta Pc$ and $\Delta Gc$ are manually controlled, these set values may be required to be set at least prior to their necessity and it is unnecessary to initially set these values as mentioned above. When these set values are fully controlled under control of a microcomputer, it is necessary to initially set and store these set values as mentioned above.

Next, the detection values E, V, P and $\Delta \lambda$ from the output monitor 5, discharging power supply 3, oscillator 2 and spectrum width monitor 7 are applied to the controller 1 (step 102). The detected laser output E is compared with the target laser output Ec (step 103). When E<Ec as its comparison result, an increment $\Delta V$ is added to the charging voltage V so that the next detected laser output E is increased to the target laser output Ec, and the addition voltage is output to the discharging power supply 3 as the command charging voltage Va (step 104). When E=Ec as its comparison result, the detected charging voltage V is output to the discharging power supply 3 as the command charging voltage Va as it is (step 105). When E>Ec as its comparison result, a decrement $\Delta V$ is subtracted from the detected charging voltage V so that the next detected laser output E is decreased down to the target laser output Ec. The subtraction voltage is output to the discharging power supply 3 as the command charging voltage Va (step 106).

The command charging voltage Va is compared with the maximum value Vmax in the optimum control charging voltage range Vc. When Va≦Vmax and the voltage Va is within the optimum range, control is returned to the step 102 to perform the similar operation. When Va>Vmax, it is alarmed that the command voltage became out of the allowable range and the controller 1 issues an alarm signal prompting the gas replenishment to give an alarm to the operator.

Meanwhile, in a step 107, the number Pn of pulses accumulated from the injection of the new gases into the laser chamber 4 to the current time is detected by counting the pulse oscillation P (step 107), and the accumulation pulse number Pn is compared with the threshold value Pc (step 108). When the accumulation pulse number Pn is smaller than the threshold value Pc, it is judged that gas replenishment is unnecessary and control is returned to the step 102. However, when the accumulation pulse number Pn reaches the threshold value Pc, the gas replenishment is carried out by the replenishment amount $\Delta G$ corresponding to the threshold value Pc.

The gas replenishment is carried out in the following manner.

That is, the valve 16 is closed and the valve 17 is opened to charge the sub-tank 15 having a certain capacity with the diluted halogen gas. After the sub-tank is charged with the halogen gas, the valve 16 is opened and the valve 17 is closed to supply the halogen gas from the sub-tank 15 into the laser chamber 4. Such operation is repeated several times to perform gas replenishment by the predetermined amount $\Delta G$ (step 109). During the gas replenishing operation, the internal total pressure $P_T$ of the laser chamber 4 is increased. The total pressure $P_T$ is detected by the pressure monitor 5, and the opening and closing operation of the valve 19 is controlled on the basis of the detected value $P_T$ so that the pressure of the laser chamber 4 becomes the predetermined level (step 110).

The replenishment amount $\Delta G$ for the above gas is not necessarily the initial value set in the step 101, and varies according to the spectrum width $\Delta \lambda$ measured with use of the etalon for the above monitor or the like.

That is, the detected spectrum width $\Delta \lambda$ is compared with the target spectrum width $\Delta \lambda c$ (step 111). When $\Delta \lambda < \Delta \lambda c$ as the comparison result, the predetermined increment $\Delta g$ (absolute value) is added to the replenishment amount $\Delta G$ so that the next detected spectrum width $\Delta \lambda$ is expanded to the target spectrum width $\Delta \lambda c$, and the replenishment amount $\Delta G$ increased by the amount $\Delta g$ is supplied to the laser chamber 4 (step 112). When $\Delta \lambda > \Delta \lambda c$, a decrement $\Delta g$ is subtracted from the replenishment amount $\Delta G$ so that the next detected spectrum width $\Delta \lambda$ is narrowed down to the target spectrum width $\Delta \lambda c$, and the replenishment amount $\Delta G$ decreased by the amount $\Delta g$ is supplied to the laser chamber 4 (step 114). When $\Delta \lambda = \Delta \lambda c$ as the comparison result, the current replenishment amount $\Delta G$ is supplied to the laser chamber 4 without being increased or decreased (step 113).

As the gas replenishment amount $\Delta G$ is increased or decreased in this way, the frequency of charging and discharging operation with use of the above sub-tank is correspondingly changed, so that, when the charging and discharging operation is carried out by the changed frequency, the increased or decreased gas replenishment amount $\Delta G$ is supplied to the laser chamber 4.

Even with respect to the replenishment amount $\Delta G$, its controllable range is set as an optimum control gas replenishment amount range $\Delta Gmin$ to $\Delta Gmax$, and it is judged whether or not the current replenishment amount $\Delta G$ is within the range. When the replenishment amount $\Delta G$ is within the above range, it is judged that the predetermined processing (lithographic process, etc.) with use of the laser light can be carried out without any troubles from the viewpoint of its accuracy, and control goes again to the step 102. When the replenishment amount $\Delta G$ is out of the above range, this involves a reduction in the accuracy of the processing with use of the laser light which leads to a chromatic aberration problem, an alarm signal indicative of the effect is issued to an external controller (stepper controller). As a result, such a predetermined measure as stoppage of the processing with use of the laser light can be taken.

EMBODIMENT 2

(In the Case of Demagnification Projection Alignment Excimer Laser)

Figure 3:
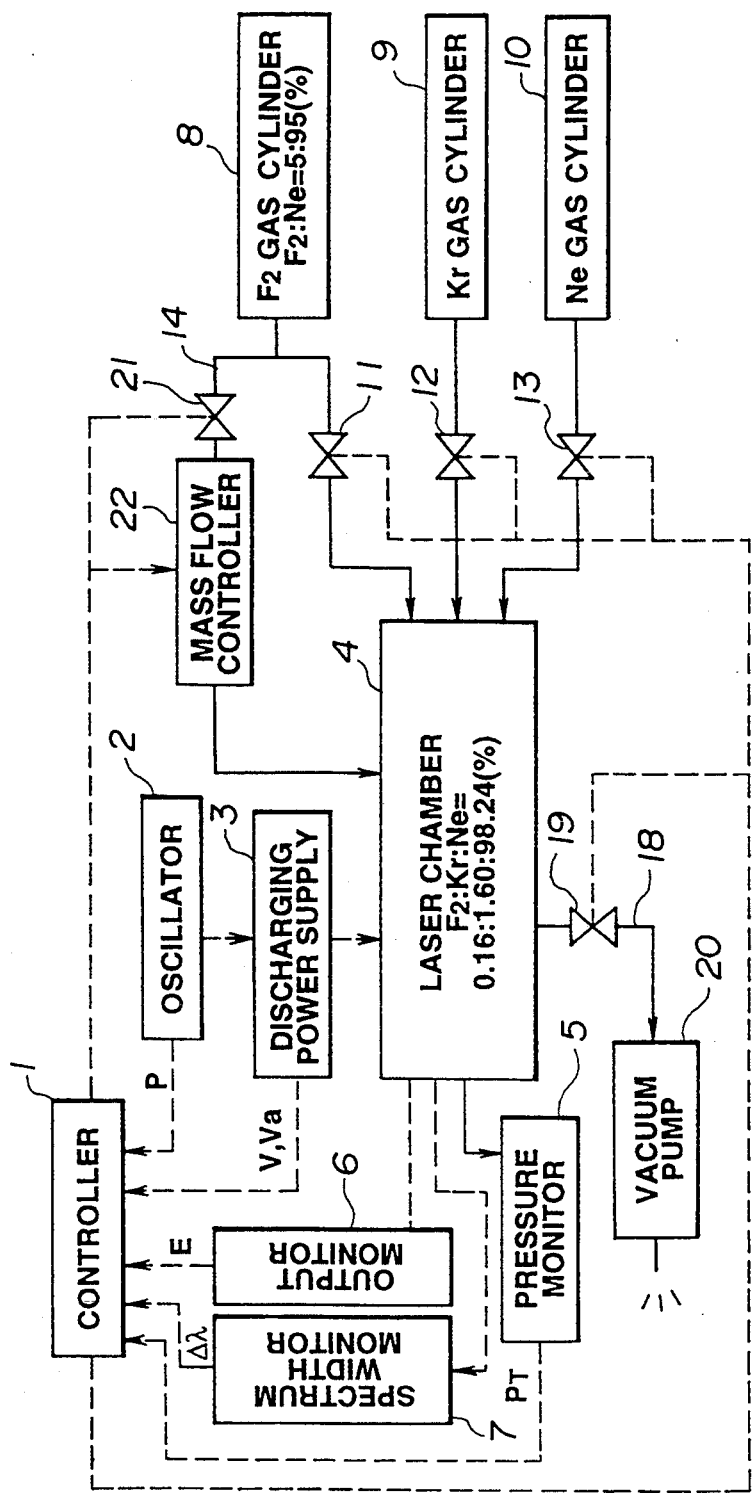
FIG. 3 is a block diagram of an arrangement of a laser gas replenishing apparatus different from that of FIG. 1 in accordance with a second embodiment of the present invention.

Another embodiment will be explained by referring to FIGS. 3 and 4 similar to FIGS. 1 and 2. In FIG. 3, parts having the same functions as those in FIG. 1 are denoted by the same reference numerals. In the present embodiment, an on-off valve 21 and a mass flow controller 22 are disposed in the gas replenishment line 14. The mass flow controller 22 acts to control the amount of gas flowing through the gas replenishment line 14 in such a manner that a mass flow becomes a predetermined constant value.

Figure 4:
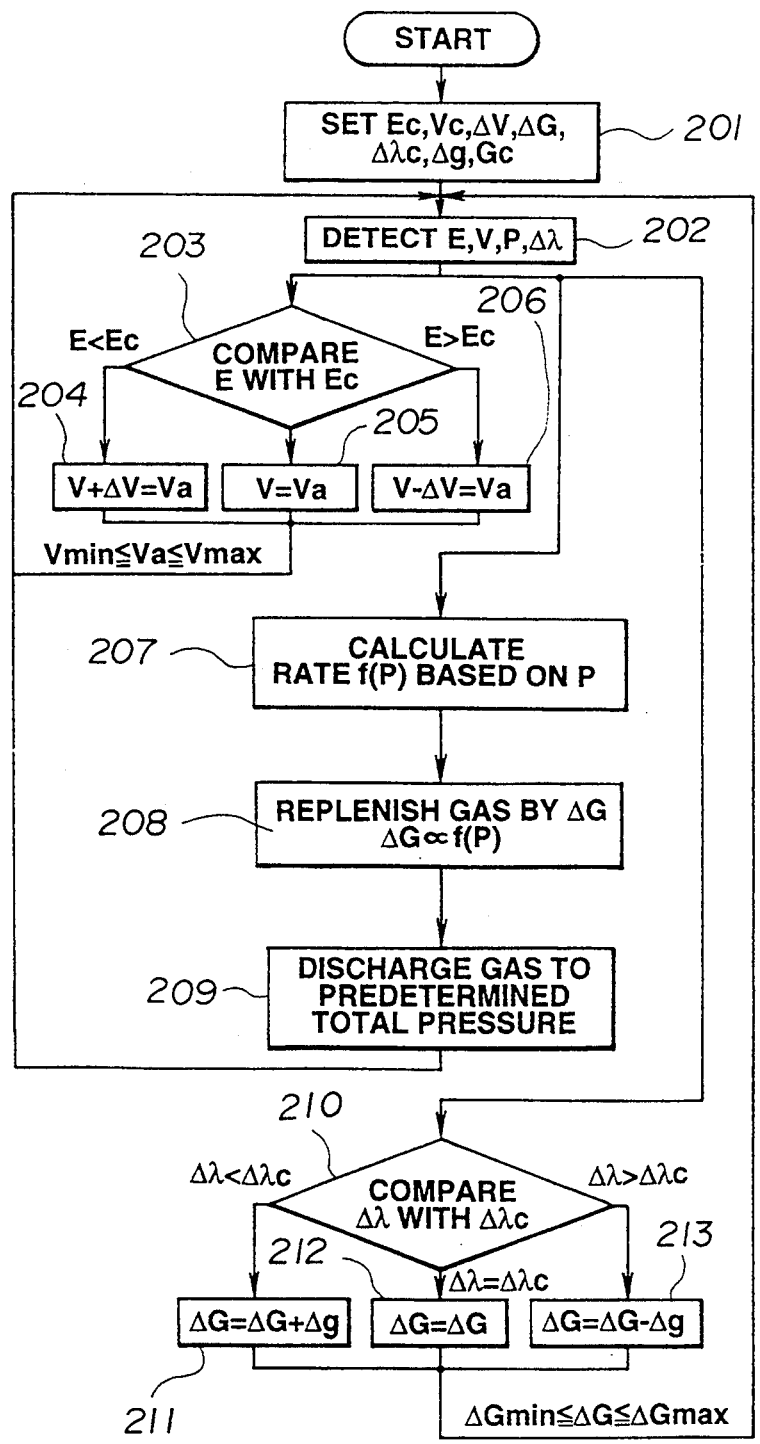
FIG. 4 is a flowchart for explaining the procedure of gas replenishing processes carried out in the system of the second embodiment of FIG. 3.

Shown in FIG. 4 is a flowchart for explaining the procedure of replenishing operation carried out in the system of FIG. 3. Similarly to the foregoing first embodiment, a target laser output Ec, optimum control charging voltage range Vc (Vmin to Vmax), increment/decrement command charging voltage $\Delta V$ (absolute value), replenishment gas amount $\Delta G$ (initial value) by one operation, target spectrum width $\Delta\lambda c$, replenishment gas increment/decrement $\Delta g$ (absolute value), and optimum control gas replenishment amount range $\Delta Gc$ ($\Delta Gmin$ to $\Delta Gmax$) are previously set on the basis of input data (step 201).

Next, the detection values E, V, P and $\Delta\lambda$ issued from the above output monitor 5, discharging power supply 3, oscillator 2 and spectrum width monitor 7 are applied to the controller 1 (step 202).

The detected laser output E is compared with the target laser output Ec (step 203). When E<Ec as its comparison result, an increment $\Delta V$ is added to the charging voltage V so that the next detected laser output E is increased to the target laser output Ec, and the resulted voltage is output to the discharging power supply 3 as the command charging voltage Va (step 204). When E=Ec as its comparison result, the detected charging voltage V is output to the discharging power supply 3 as the command charging voltage Va as it is (step 205). When E>Ec as its comparison result, a decrement $\Delta V$ is subtracted from the detected charging voltage V so that the next detected laser output E is decreased down to the target laser output Ec. The resulted voltage is output to the discharging power supply 3 as the command charging voltage Va (step 206).

The command charging voltage Va is compared with the maximum value Vmax in the optimum control charging voltage range Vc. When Va$\leq$Vmax and the voltage Va is within the optimum range, control is returned to the step 202 to perform the similar operation. When Va>Vmax, it is alarmed that the command voltage became out of the allowable range and the controller 1 issues an alarm signal prompting the gas replenishment to give an alarm to the operator.

In the present second embodiment, gas replenishment of the diluted halogen gas is carried out under control of the mass flow controller 22 at a rate proportional to the number of oscillation pulses per unit time, i.e., to an oscillation pulse rate f(P).

That is, the pulse oscillation rate f(P) at the current oscillation time is calculated on the basis of the pulse oscillation P (step 207), and the halogen gas is replenished to the laser chamber 4 with the replenishment amount $\Delta G$ proportional to the rate f(P).

The gas replenishment is carried out in the following manner.

That is, the valve 21 is opened to control a flow rate in the gas replenishment line 14 under control of the mass flow controller 22 in such a manner that the flow rate flowing the line 14 becomes constant corresponding to the above rate f(P). Accordingly the valve 21 is kept open for a predetermined time of period so that gas replenishment is carried out with the above flow rate and thus the predetermined amount of gas $\Delta G$ is replenished to the laser chamber 4.

Such control is also possible as to keep open the valve 21 for a time corresponding to the above rate f(P) under a condition that the flow rate controlled by the mass flow controller 22 is fixed at a constant level. Even in this case, the predetermined amount of gas $\Delta G$ is replenished to the laser chamber 4 in accordance with the open time of the valve 21 and the flow rate controlled by the mass flow controller 22 (step 208). During the gas replenishment, the internal total pressure $P_T$ of the laser chamber 4 is increased. The total pressure $P_T$ is detected by the pressure monitor 5 and the opening and closing operation of the valve 19 is controlled on the basis of the detected value $P_T$ so that the pressure of the laser chamber 4 becomes a predetermined level (step 209).

The replenishment amount $\Delta G$ for the above gas is not necessarily the initial value set in the step 201, and varies according to the spectrum width $\Delta\lambda$ measured with use of the etalon for the above monitor or the like.

That is, the detected spectrum width $\Delta\lambda$ is compared with the target spectrum width $\Delta\lambda c$ (step 210). When $\Delta\lambda<\Delta\lambda c$ as the comparison result, the predetermined increment $\Delta g$ (absolute value) is added to the replenishment amount $\Delta G$ so that the next detected spectrum width $\Delta\lambda$ is expanded to the target spectrum width $\Delta\lambda c$, and the replenishment amount $\Delta G$ increased by the amount $\Delta g$ is supplied to the laser chamber 4 (step 211). When $\Delta\lambda>\Delta\lambda c$, a decrement $\Delta g$ is subtracted from the replenishment amount $\Delta G$ so that the next detected spectrum width $\Delta\lambda$ is narrowed down to the target spectrum width $\Delta\lambda c$, and the replenishment amount $\Delta G$ decreased by the amount $\Delta g$ is supplied to the laser chamber 4 (step 213). When $\Delta\lambda=\Delta\lambda c$ as the comparison result, the current replenishment amount $\Delta G$ is supplied to the laser chamber 4 without being increased or decreased (step 212).

Even with respect to the replenishment amount $\Delta G$, its controllable range is set as an optimum control gas replenishment amount range $\Delta Gmin$ to $\Delta Gmax$, and it is judged whether or not the current replenishment amount $\Delta G$ is within the range. When the replenishment amount $\Delta G$ is within the above range, it is judged that the predetermined processing (lithographic process, etc.) with use of the laser light can be carried out without any troubles from the viewpoint of its accuracy, and control goes again to the step 202. When the replenishment amount $\Delta G$ is out of the above range, this involves a reduction in the accuracy of the processing with use of the laser light which leads to a chromatic aberration problem, an alarm signal indicative of the effect is issued to an external controller (stepper controller). As a result, such a predetermined measure as stoppage of the processing with use of the laser light can be taken.

Figure 5:
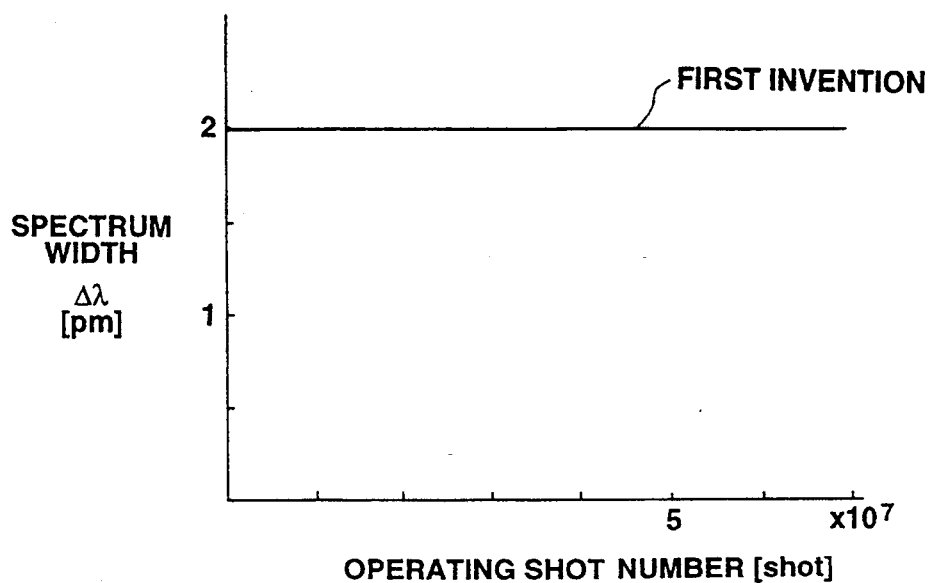
FIG. 5 is a graph showing a relationship between the operating shot number and spectrum width to explain the effects of the first invention.
Figure 6:
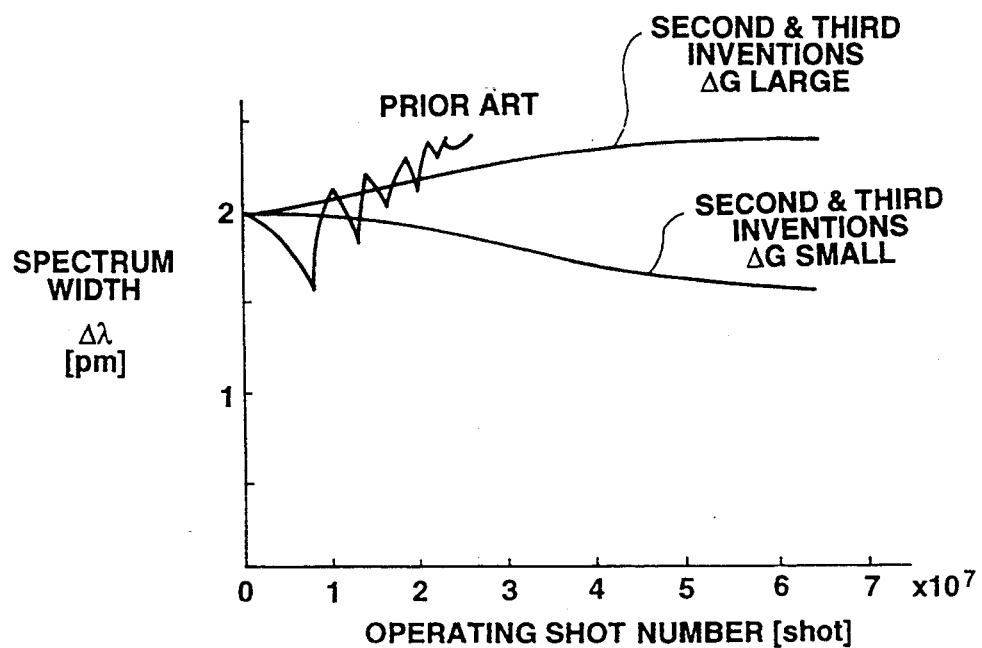
FIG. 6 is a graph showing relationships between the operating shot number and spectrum width to explain the effects of the second and third inventions in comparison with a prior art.
Figure 7:
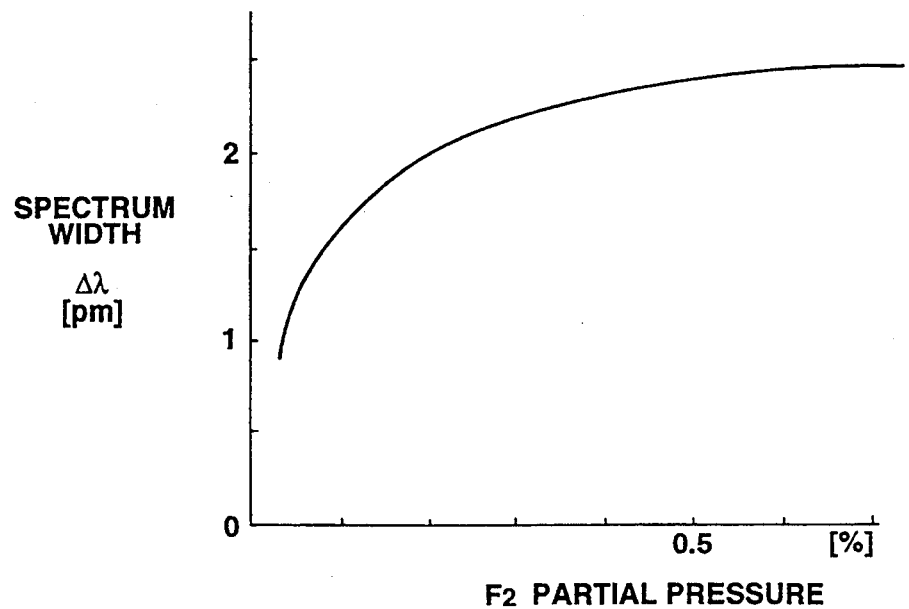
FIG. 7 is a graph showing a relationship between the fluorine gas partial pressure and spectrum width.
Figure 8:
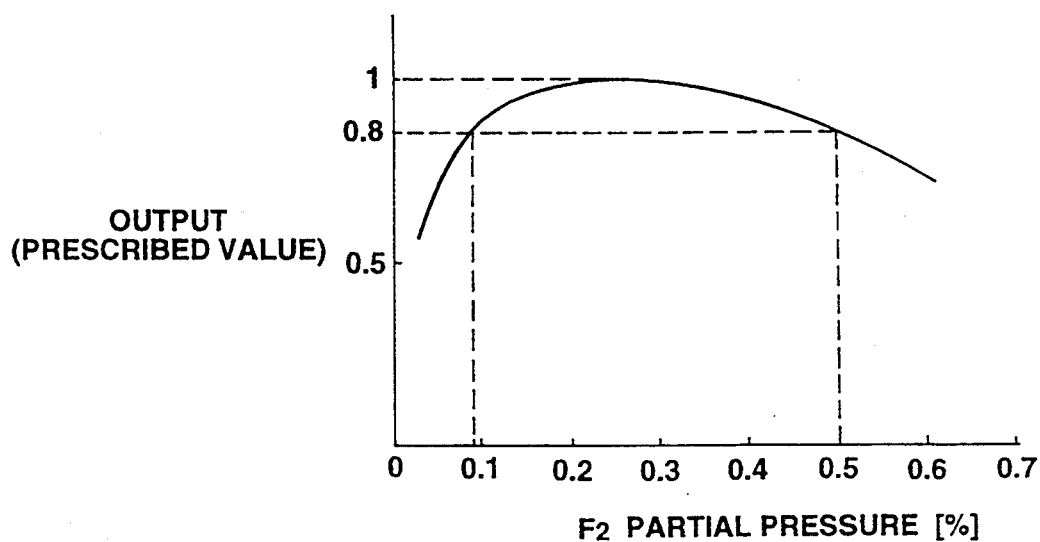
FIG. 8 is a graph showing a relationship between the fluorine gas partial pressure and laser output.

FIG. 5 is a graph showing a variation in the spectrum width Δλ with respect to the operating shot number when control is carried out according to the foregoing embodiment, in which a predetermined width of spectrum can be obtained always stably, as will be seen from the comparison with the prior art shown in FIG. 6. Accordingly, in accordance with the present embodiment, the processing with use of the laser light can be accurately carried out.

EMBODIMENT 3

Figure 9:
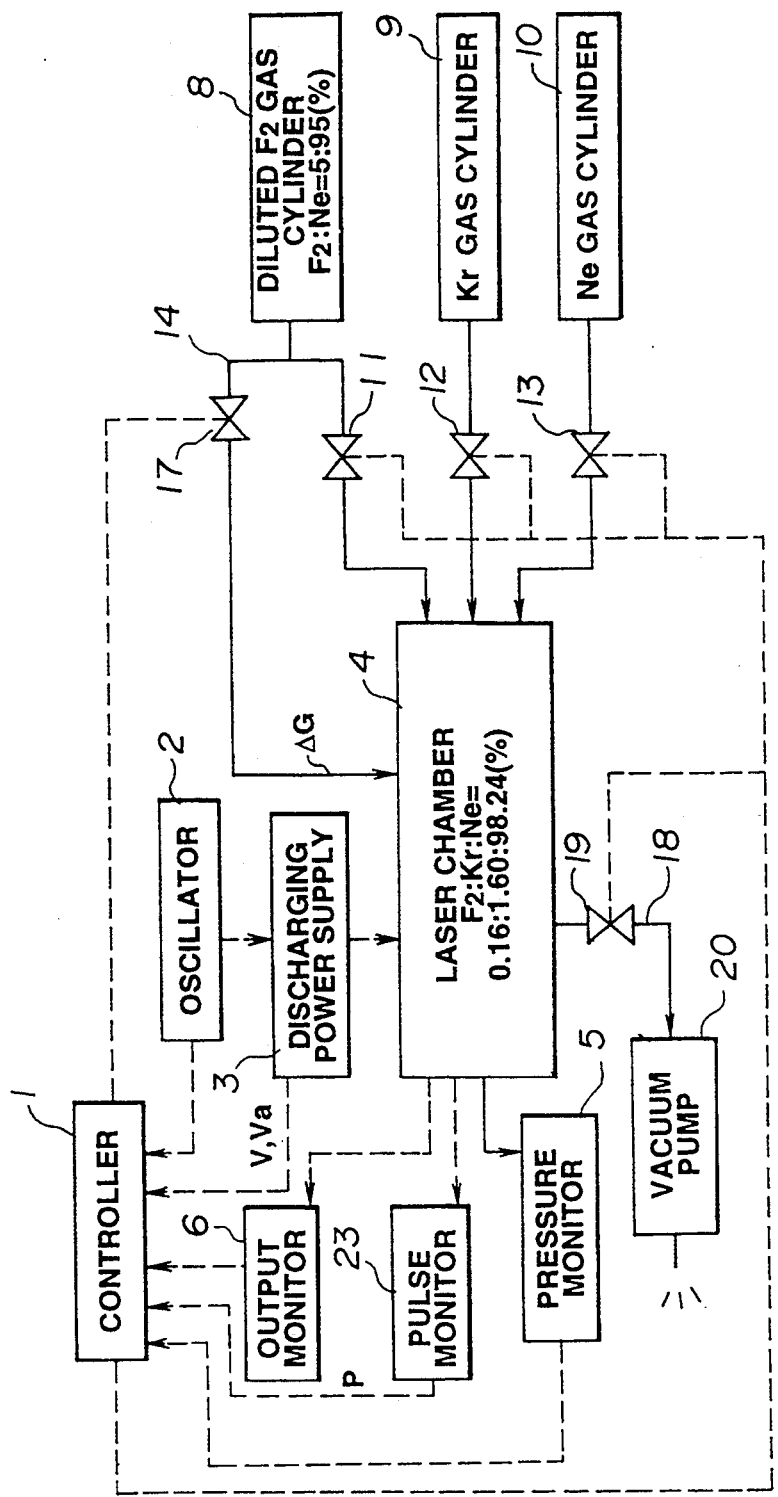
FIG. 9 is a block diagram of an arrangement of a laser gas replenishing apparatus different from that of the systems of the first and second embodiments in accordance with a third embodiment of the present invention.

Shown in FIG. 9 is an arrangement of an embodiment different from the embodiments of FIGS. 1 and 3. In FIG. 9, the explanation of constituent elements having the same functions as those in FIGS. 1 and 3 is omitted.

In a third embodiment, a laser oscillation pulse P is detected by a pulse monitor 23 and then applied to the controller 1 to determine the gas replenishment timing on the basis of the laser oscillation pulse P. In this case, the spectrum width monitor 7 is not provided and the sub-tank 15 is not provided on the gas replenishment line 14.

Figure 10:
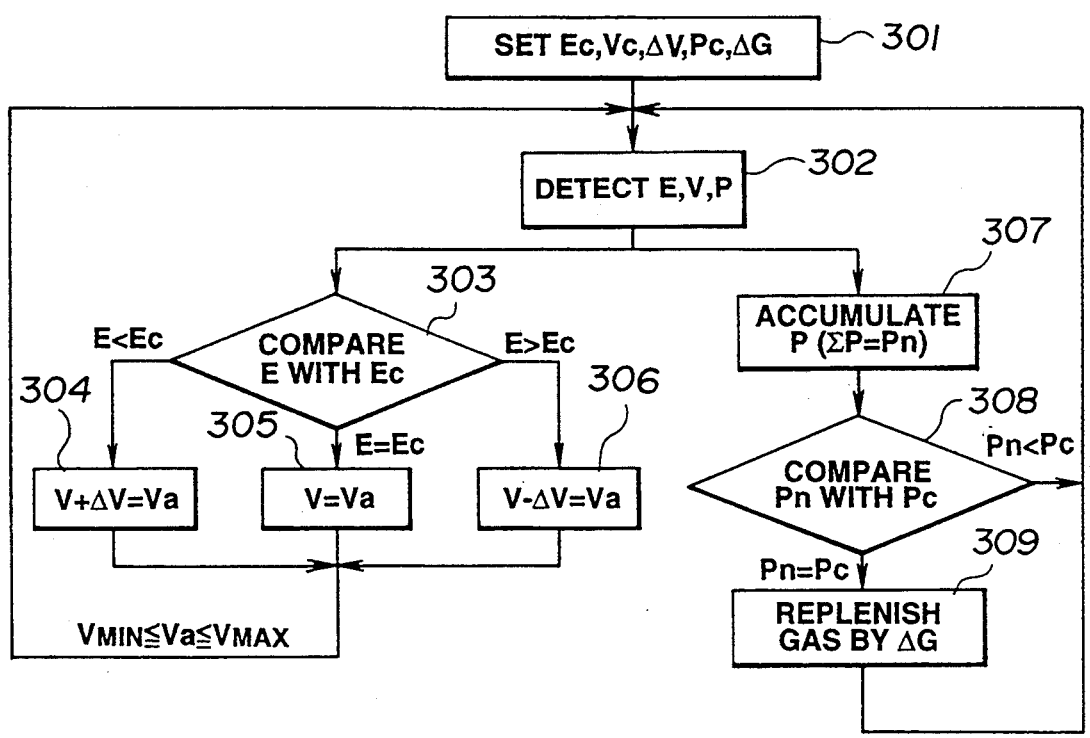
FIG. 10 is a flowchart for explaining the operation of the third embodiment of the present invention.

The third embodiment of the present invention will be explained by referring to a flowchart of FIG. 10.

Figure 18:
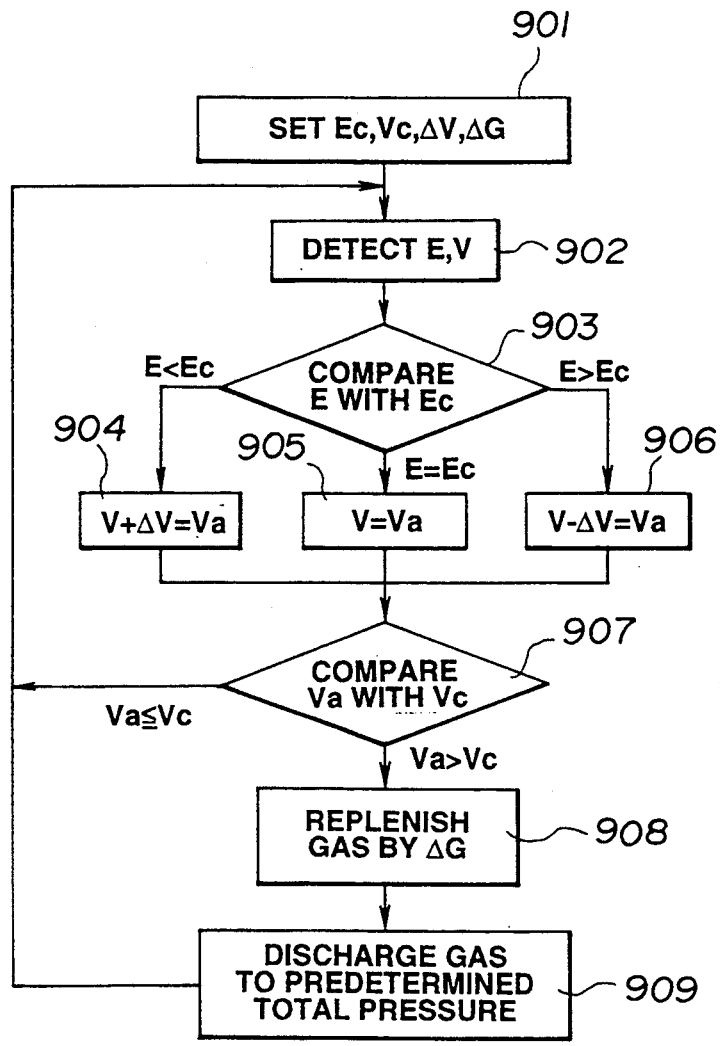
FIG. 18 is a flowchart for explaining the procedure of gas replenishing processes in the prior art.
Figure 19:
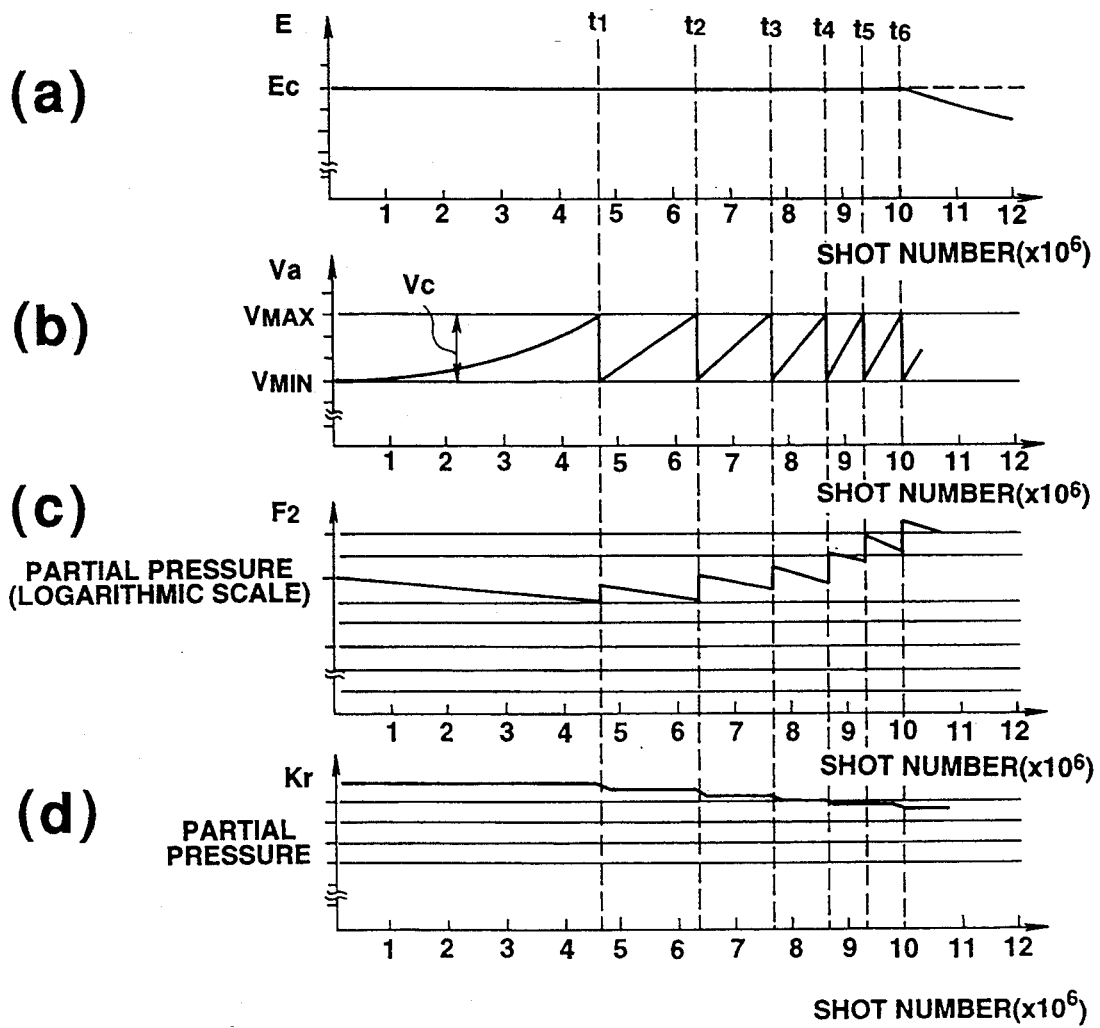
FIG. 19 is a timing chart for explaining disadvantages in the prior art.

In the third embodiment, the gas replenishment is carried out when the laser oscillation pulse number Pn reaches a predetermined threshold value Pc, in which the exhaustion step (the step 909 in FIG. 18) of keeping the total gas pressure constant during the gas replenishment is intentionally omitted.

Explanation will be made according to the flowchart of FIG. 10.

That is, after the laser chamber 4 is charged with new gases, prior to starting the operation of the excimer laser system, the target laser output Ec, optimum control charging voltage range Vc (Vmin to Vmax), charging voltage increment/decrement ΔV by one control, threshold value Pc for comparison with the laser oscillation pulse number, and replenishment gas amount ΔG by one operation are previously set (step 301).

Thereafter, when the operation of the laser is started, a laser output E detected by the laser output monitor 6, a charging voltage V detected by a charging voltage detector 24, and a laser oscillation pulse number P detected by the pulse monitor 23 are applied to the controller 1 (step 302).

The controller 1 compares the detection laser output E with the target laser output Ec (step 303). When E<Ec, the controller 1 increases the detection charging voltage V by the above fine voltage ΔV to obtain a command charging voltage Va (step 304); when E=Ec, the controller issues the detection charging voltage V as it is as the command charging voltage Va (step 305); and when E>Ec, the controller decreases the detection charging voltage V by the above fine voltage ΔV to obtain the command charging voltage Va (step 306).

In parallel with the above, the controller 1 counts (accumulates) the received laser oscillation pulse P (step 307) to obtain a count value Pn, and compares the count value Pn with the set threshold value Pc (step 308). And when the count value Pn exceeds the threshold value Pc, the controller controls the on-off valve 17 to cause the predetermined amount ΔG of the F2 gas containing the Ne gas to be replenished from the gas cylinder 8 to the laser chamber 4 (step 309).

In the present third embodiment, since the exhaustion step (the step 909 in FIG. 18) of keeping the total gas pressure constant during the gas replenishment is intentionally omitted, the total gas pressure is increased but a molecule number density for the rare gas (Kr) component per unit volume is kept constant. Accordingly, a reduction in the laser output caused by the dilution of the rare gas component due to the replenishment of the halogen gas can be suppressed.

In the third embodiment, the gas replenishment is set to be started when the laser oscillation pulse number Pn reaches the predetermined threshold value Pc. That is, it has been found out from experiments that the halogen gas (F2) partial pressure within the laser chamber 4 linearly decreases as the laser oscillation pulse number Pn (laser shot number) increases. In other words, there is a direct unique relationship between the halogen gas partial pressure and laser oscillation pulse number Pn. Therefore, when the threshold value Pc is set at a suitable value corresponding to the initial partial pressure of the halogen gas and the gas replenishment amount ΔG is set at a suitable value corresponding to the threshold value Pc, the halogen gas amount decreased truly through the laser operation can be replenished at suitable timing.

EMBODIMENT 4

Figure 11:
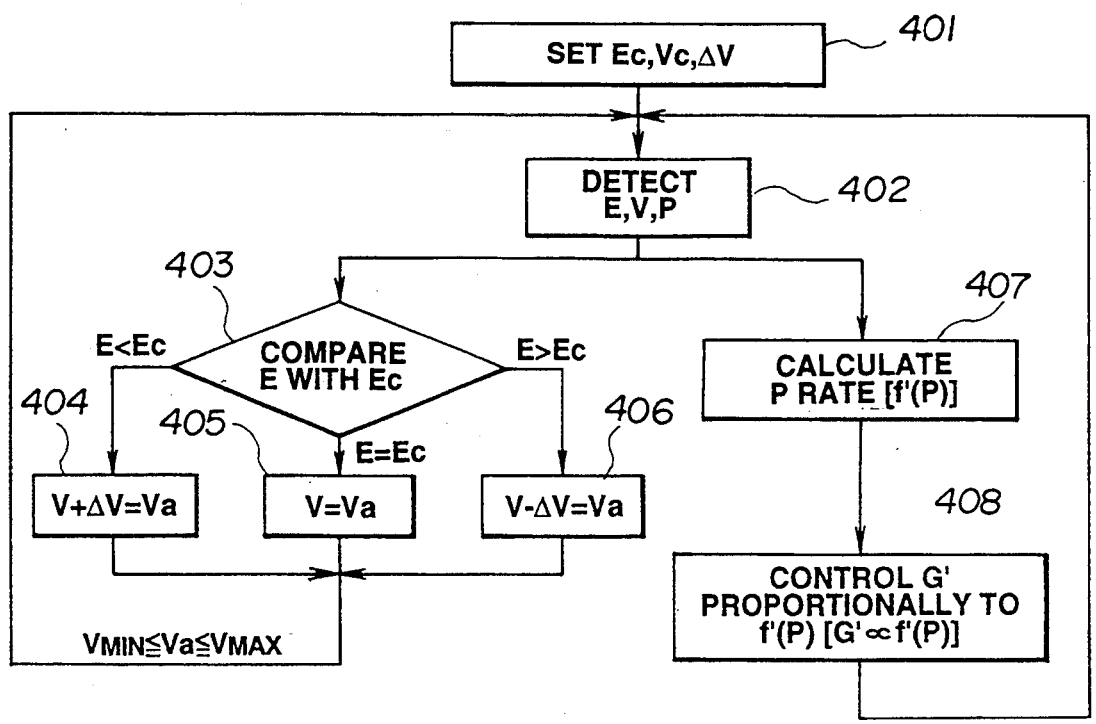
FIG. 11 is a flowchart for explaining the operation of a fourth embodiment of the present invention.

A fourth embodiment of the present invention will be explained with reference to a flowchart of FIG. 11.

Even the fourth embodiment is arranged to omit the exhaustion step in the prior art, as in the foregoing third embodiment.

In the present fourth embodiment, an operating pulse number Pe per unit time (i.e., operating pulse rate) is detected and the replenishment amount of the diluted halogen gas per unit time is controlled to be proportional to the calculated oscillation rate.

Explanation will be made by referring to the flowchart of FIG. 11.

That is, after the laser chamber 4 is charged with new gases, prior to starting the operation of the excimer laser system, the target laser output Ec, optimum control charging voltage range Vc (Vmin to Vmax), charging voltage increment/decrement ΔV by one control are previously set (step 401).

Thereafter, when the operation of the laser is started, a laser output E detected by the laser output monitor 6, a charging voltage V detected by a charging voltage detector 24, and a laser oscillation pulse number P detected by the oscillator 2 are applied to the controller 1 (step 402).

The controller 1, as in the foregoing third embodiment, compares the detection laser output E with the target laser output Ec (step 403). When E<Ec, the controller 1 increases the detection charging voltage V by the above fine voltage ΔV to obtain a command charging voltage Va (step 404); when E=Ec, the controller issues the detection charging voltage V as it is as the command charging voltage Va (step 405); and when E>Ec, the controller decreases the detection charging voltage V by the above fine voltage ΔV to obtain the command charging voltage Va (step 406).

In parallel with the above, the controller 1 calculates the rate of received laser oscillation pulse P (step 407), and controls the on-off valve 17 in such a manner that a replenishment amount G' for the diluted halogen gas F2 per unit time becomes in proportion to the calculated oscillation rate (step 408).

The above gas replenishment may be carried out always continuously or intermittently. In other words, any control may be employed so long as the replenishment amount G' for the diluted halogen gas F2 per unit time eventually becomes in proportion to a laser oscillation rate f'(P).

EMBODIMENT 5

Figure 12:
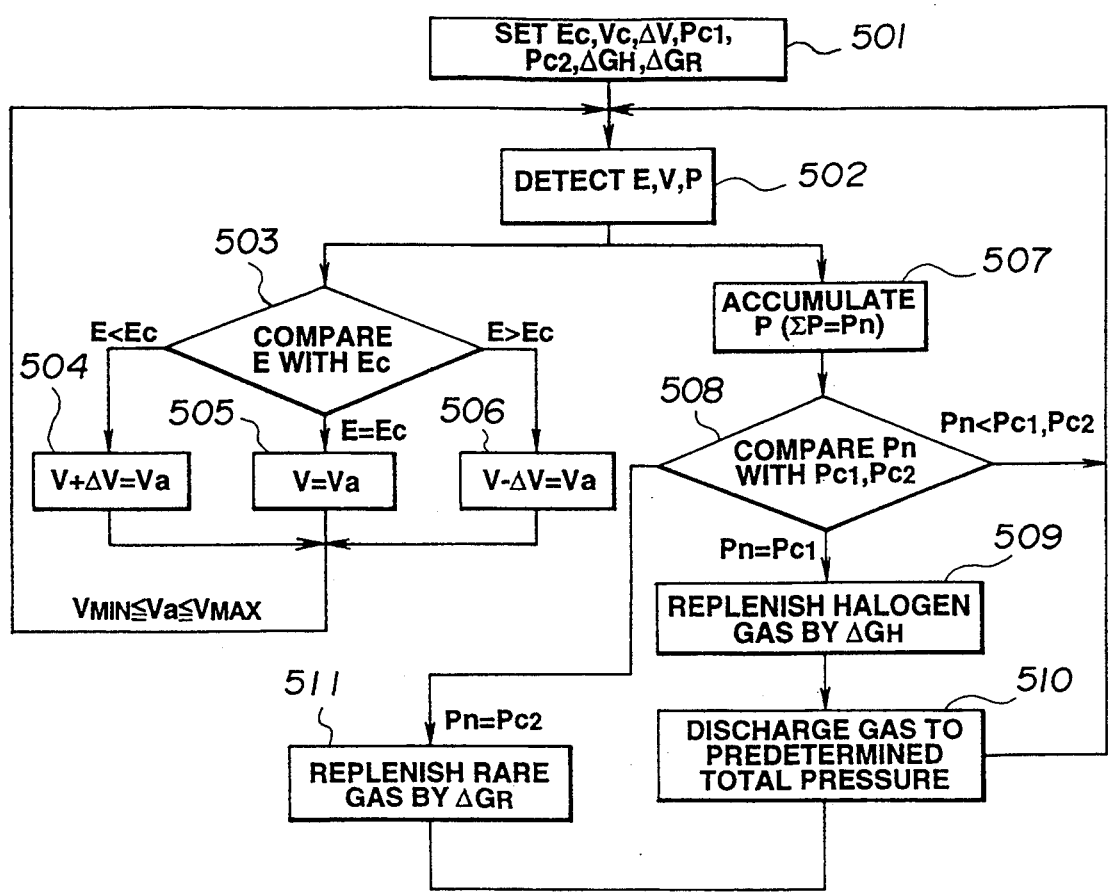
FIG. 12 is a flowchart for explaining the operation of a fifth embodiment of the present invention.

A fifth embodiment of the present invention will be explained with reference to a flowchart of FIG. 12.

The present fifth embodiment is arranged to replenish not only the diluted halogen gas F2 but also the rare gas Kr. Since the rare gas is replenished, the exhaustion step of keeping the total gas pressure constant during the gas replenishment is provided as in the prior art (step 510).

The replenishment of the diluted halogen gas is carried out when the laser oscillation pulse number Pn exceeds a predetermined threshold value Pc1, while the replenishment of the rare gas is carried out when the laser oscillation pulse number Pn exceeds a predetermined threshold value Pc2.

Explanation will be made by referring to the flowchart of FIG. 12.

That is, after the laser chamber 4 is charged with new gases, prior to starting the operation of the excimer laser system, the target laser output Ec, optimum control charging voltage range Vc (Vmin to Vmax), charging voltage increment/decrement $\Delta V$ by one control, threshold value Pc1 for the halogen gas, threshold value Pc2 for the rare gas, halogen gas replenishment amount $\Delta GH$ for by one operation, and rare gas replenishment amount $\Delta GR$ by one operation are previously set (step 501).

Thereafter, when the operation of the laser is started, a laser output E detected by the laser output monitor 6, a charging voltage V detected by a charging voltage detector 24, and a laser oscillation pulse number P detected by the pulse monitor 23 are applied to the controller 1 (step 502).

The controller 1, as in the foregoing embodiment, compares the detection laser output E with the target laser output Ec (step 503). When E<Ec, the controller 1 increases the detection charging voltage V by the above fine voltage $\Delta V$ to obtain a command charging voltage Va (step 504); when E=Ec, the controller issues the detection charging voltage V as it is as the command charging voltage Va (step 505); and when E>Ec, the controller decreases the detection charging voltage V by the above fine voltage $\Delta V$ to obtain the command charging voltage Va (step 506).

In parallel with the above, the controller 1 counts (accumulates) the received laser oscillation pulse P (step 507) to obtain a count value Pn, and compares the count value Pn with the above set halogen gas and rate gas threshold values Pc1 and Pc2 (step 508). And as soon as the count value Pn exceeds the threshold value Pc1, the controller controls the on-off valve 17 to cause the predetermined amount $\Delta GH$ of the F2 gas containing the Ne gas to be replenished from the gas cylinder 8 to the laser chamber 4 (step 509), and also refers to the detection value of the pressure monitor 5 to cause the gas to be partly exhausted from the laser chamber so that the total pressure of the laser chamber 4 is kept at a predetermined level (step 510).

In the comparing operation of the step 508, as soon as the count value Pn exceeds the threshold value Pc2, the controller controls the on-off valve 12 to cause the predetermined amount $\Delta GR$ of Kr gas to be replenished from the gas cylinder 9 to the laser chamber 4 (step 511), and also refers to the detection value of the pressure monitor 5 to cause the gas to be partly exhausted from the laser chamber so that the total pressure of the laser chamber 4 is kept at a predetermined level (step 510).

The replenishment of the rare gas is effected by such an amount as to compensate for the dilution caused by the replenishment of the halogen gas. However, since the replenishment amount of the rare gas component is very small, when less than 10% of diluted rare gas is used, accurate replenishment can be realized.

In the fifth embodiment, since replenishment is carried out not only for the halogen gas but also for the rare gas and the exhaustion step is used to controllably keep the total pressure at a predetermined level, the partial pressure of the rare gas component per unit volume can be kept constant and thus a reduction in the laser output caused by the dilution of the rare gas component due to the replenishment of the halogen gas can be completely compensated for.

Figure 16A:
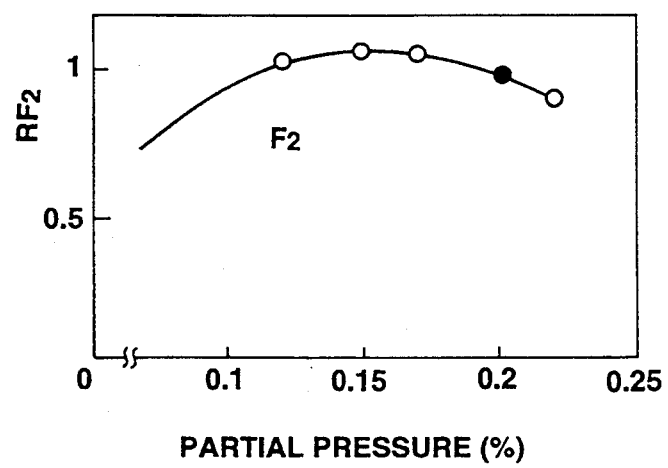
FIGS. 16(a) and 16(b) show graphs of relationships between the partial pressure and laser output power with respect to different gas components.
Figure 16B:
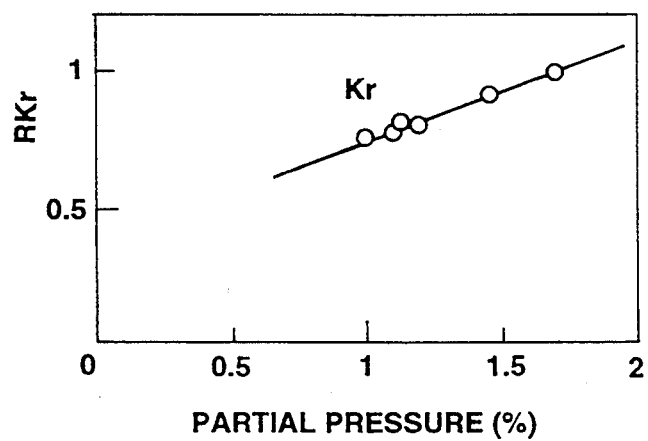
Figure 17:
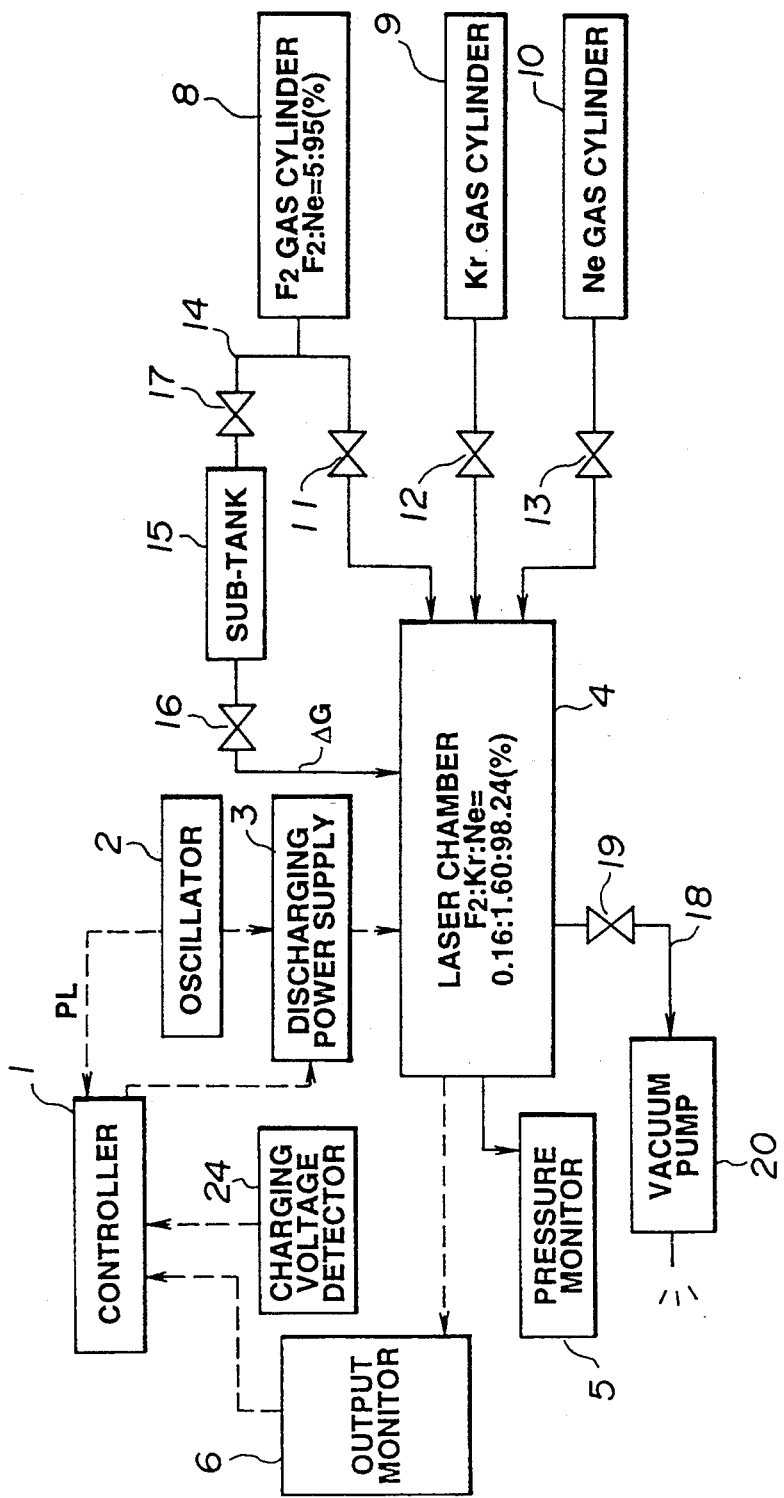
FIG. 17 is a block diagram of an arrangement of a gas replenishing apparatus in a general fluorine-series gas excimer laser system.

As shown in FIG. 16(b), the rare gas (Kr), unlike the halogen gas (F2), has an effect of increasing the laser output as its partial pressure increases. Accordingly, when the compensation amount of the rare gas is set to be somewhat higher to provide somewhat excessive replenishment, the above output increasing effect of the rare gas enables additional prolongation of the gas life.

EMBODIMENT 6

Figure 13:
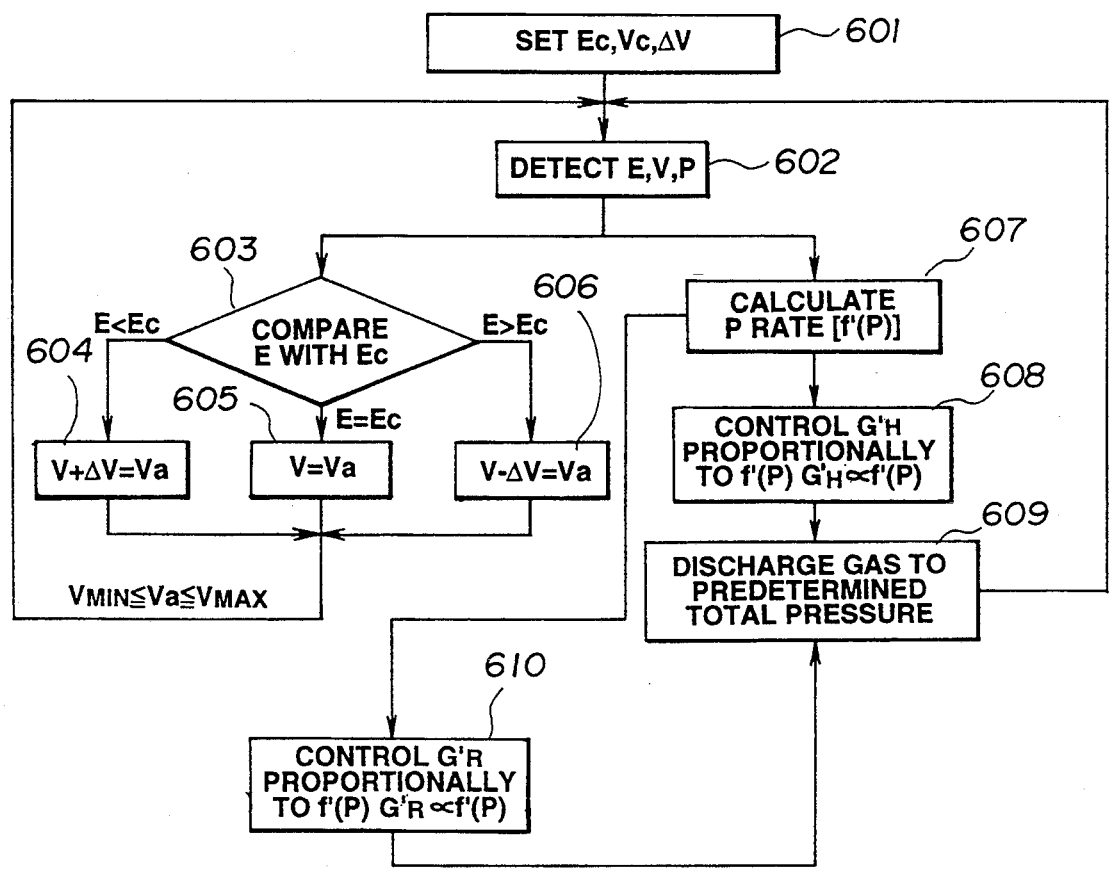
FIG. 13 is a flowchart for explaining the operation of a sixth embodiment of the present invention.

A sixth embodiment of the present invention will be explained by referring to a flowchart of FIG. 13.

The sixth embodiment is arranged, as in the foregoing fifth embodiment, to replenish not only the diluted halogen gas F2 but also the rare gas Kr. Since the rare gas is replenished, the exhaustion step of keeping the total gas pressure constant during the gas replenishment is provided as in the prior art (step 609).

Like the foregoing fourth embodiment, a replenishment rate GH' for the diluted halogen gas and a replenishment rate GR' for the rare gas are controlled so as to be proportional to a rate f'(P) of the laser oscillation pulse P.

Explanation will be made with reference to the flowchart of FIG. 13.

That is, after the laser chamber 4 is charged with new gases, prior to starting the operation of the excimer laser system, the target laser output Ec, optimum control charging voltage Vc (Vmin to Vmax), and charging voltage increment/decrement $\Delta V$ by one control are previously set (step 601).

Thereafter, when the operation of the laser is started, a laser output E detected by the laser output monitor 6, a charging voltage V detected by a charging voltage detector 24, and a laser oscillation pulse number P detected by the pulse monitor 23 are applied to the controller 1 (step 602).

The controller 1, as in the foregoing embodiment, compares the detection laser output E with the target laser output Ec (step 603). When E<Ec, the controller 1 adds the above fine voltage $\Delta V$ to the detection charging voltage V so that the voltage V becomes a command charging voltage Va (step 604); when E=Ec, the controller issues the detection charging voltage V as it is as the command charging voltage Va (step 605); and when E>Ec, the controller subtracts the above fine voltage $\Delta V$ from the detection charging voltage V so that the voltage V becomes the command charging voltage Va (step 606).

In parallel with the above, the controller 1 calculates the rate of the received laser oscillation pulse P (step 607), and controls the on-off valve 17 to cause the replenishment amount GH' of the diluted halogen gas F2 per unit time to be proportional to the calculated laser oscillation rate (step 608), controls the on-off valve 12 to cause the replenishment amount GR' of the rare gas Kr per unit time to be proportional to the calculated laser oscillation rate (step 610), and also refers to the detection value of the pressure monitor 5 to cause the gas to be partly exhausted from the laser chamber so that the total pressure of the laser chamber 4 is kept at a predetermined level (step 609).

The above replenishment of the halogen and rare gases may be carried out always continuously or intermittently. In other words, any control may be employed so long as the replenishment amount GH' for the diluted halogen gas F2 per unit time and the replenishment amount GR' for the rare gas Kr per unit time eventually become in proportion to a laser oscillation rate f'(P).

Even in the present embodiment the replenishment of the rare gas is effected by such an amount as to compensate for the dilution caused by the replenishment of the halogen gas. However, since the replenishment amount of the rare gas component is very small, when less than 10% of diluted rare gas is used, accurate replenishment can be realized.

EMBODIMENT 7

Figure 14:
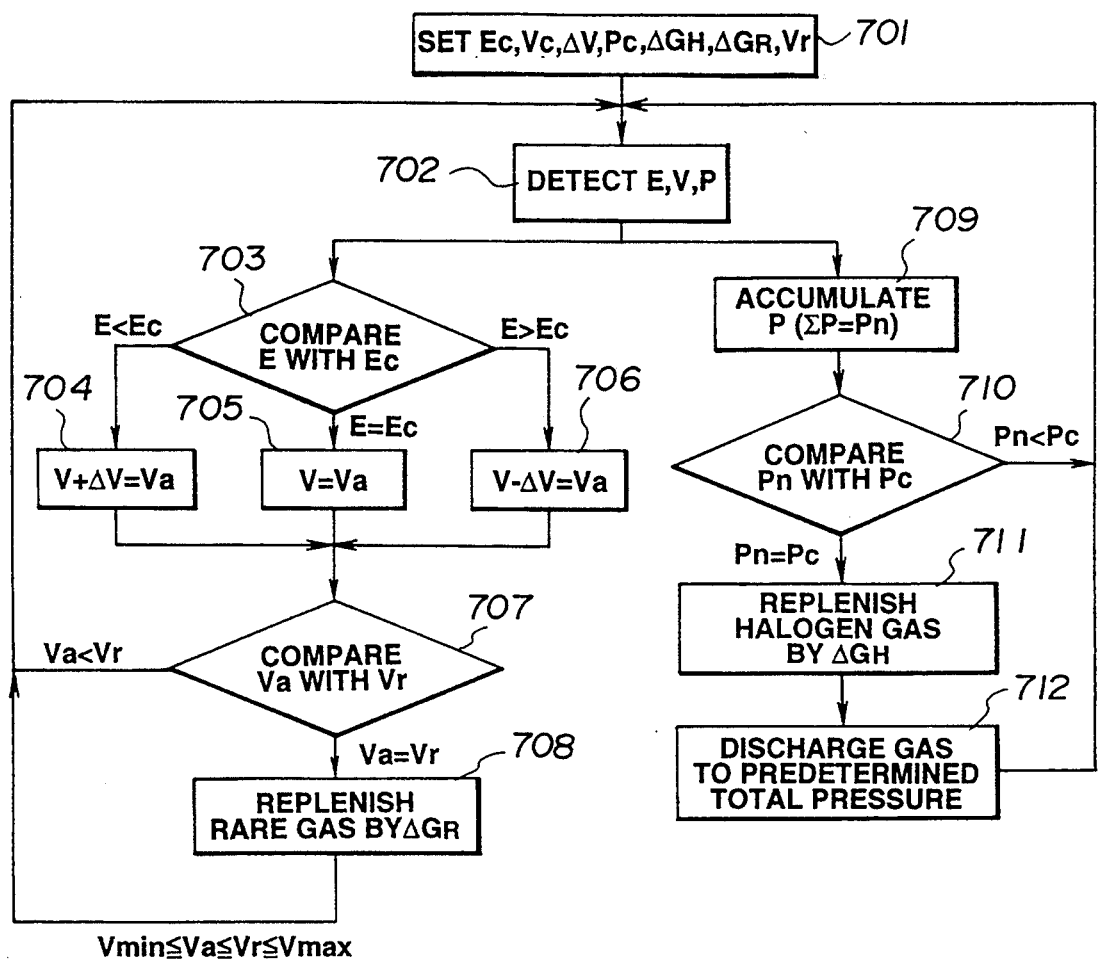
FIG. 14 is a flowchart for explaining the operation of a seventh embodiment of the present invention.

A seventh embodiment of the present invention will be explained by referring to a flowchart of FIG. 14.

In the seventh embodiment, the replenishment is carried out not only for the halogen gas F2 but also for the rare gas Kr. Since the rare gas is replenished, the exhaustion step of keeping the total gas pressure constant during the gas replenishment is provided as in the prior art (step 712).

Further, the replenishment of the diluted halogen gas is set to be started when the laser oscillation pulse number Pn exceeds the predetermined threshold value Pc1, whereas the replenishment of the rare gas is set to be started when the command charging voltage Va exceeds a threshold value Vr for injection of the rare gas ($Vmin \leq Va \leq Vr \leq Vmax$).

Explanation will be made by referring to the flowchart of FIG. 14.

After the laser chamber 4 is charged with new gases, prior to starting the operation of the excimer laser system, the target laser output Ec, optimum control charging voltage range Vc (Vmin to Vmax), charging voltage increment/decrement $\Delta V$ by one control, threshold value Pc for comparison with the pulse number, halogen gas replenishment amount $\Delta GH$ for by one operation, rare gas replenishment amount $\Delta GR$ by one operation, and threshold voltage Vr for injection of the rare gas are previously set (step 701).

Thereafter, when the operation of the laser is started, a laser output E detected by the laser output monitor 6, a charging voltage V detected by a charging voltage detector 24, and a laser oscillation pulse number P detected by the pulse monitor 23 are applied to the controller 1 (step 702).

The controller 1, as in the foregoing embodiment, compares the detection laser output E with the target laser output Ec (step 703). When E<Ec, the controller 1 increases the detection charging voltage V by the above fine voltage $\Delta V$ to obtain a command charging voltage Va (step 704); when E=Ec, the controller issues the detection charging voltage V as it is as the command charging voltage Va (step 705); and when E>Ec, the controller decreases the detection charging voltage V by the above fine voltage $\Delta V$ to obtain the command charging voltage Va (step 706).

Further, the controller 1 compares the command charging voltage Va with the threshold voltage Vr for injection of the rare gas (step 707). As soon as the command charging voltage Va exceeds the threshold voltage Vr for injection of the rare gas, the controller 1 controls the on-off valve 12 to cause the predetermined amount $\Delta GR$ of Kr gas to be replenished from the gas cylinder 9 to the laser chamber 4 (step 708).

In parallel with the above, the controller 1 counts (accumulates) the received laser oscillation pulse P (step 709) to obtain a count value Pn, and compares the count value Pn with the above set halogen gas threshold value Pc (step 710). As soon as the count value Pn exceeds the threshold value Pc, the controller controls the on-off valve 17 to cause the predetermined amount $\Delta GH$ of the F2 gas containing the Ne gas to be replenished from the gas cylinder 8 to the laser chamber 4 (step 711), and also refers to the detection value of the pressure monitor 5 to cause the gas to be partly exhausted from the laser chamber so that the total pressure of the laser chamber 4 is kept at a predetermined level (step 712).

In the foregoing seventh embodiment, the replenishment of the rare gas is carried out by such an amount as to nearly compensate for the dilution caused by the replenishment of the halogen gas. However, since an increase in the charging voltage is not always constant, the dilution is not completely compensated for, but even so, when compared with the prior art control with no injection of the rare gas at all, the stability of the laser output can be remarkably improved.

Even in the present embodiment, since the replenishment amount of the rare gas component is very small, when less than 10% of diluted rare gas is used, accurate replenishment can be realized. Further, when the compensation amount of the rare gas is set to be somewhat higher to provide somewhat excessive replenishment, the above output increasing effect of the rare gas enables additional prolongation of the gas life.

EMBODIMENT 8

Figure 15:
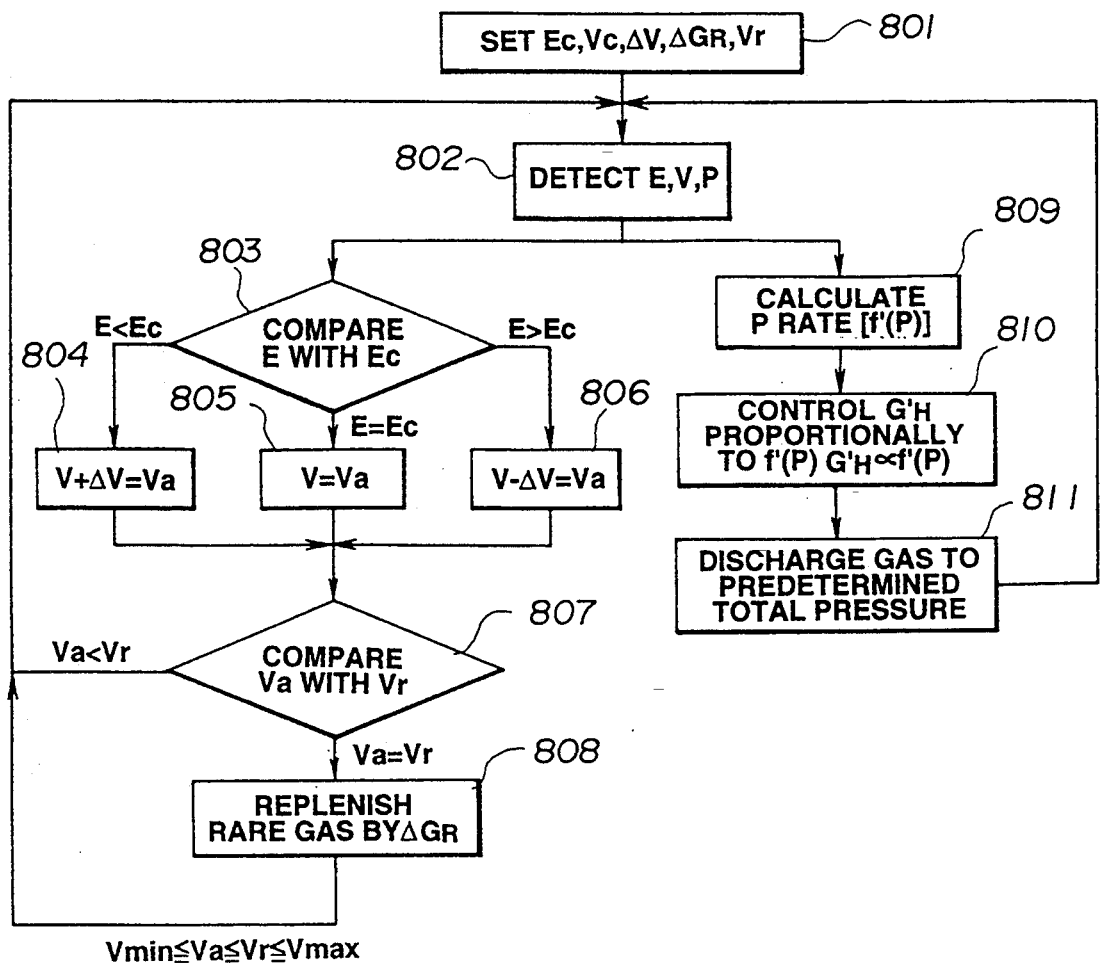
FIG. 15 is a flowchart for explaining the operation of an eighth embodiment of the present invention.

An eighth embodiment of the present invention will be explained by referring to a flowchart of FIG. 15.

The eighth embodiment is arranged to replenish not only the diluted halogen gas F2 but also the rare gas Kr. Since the rare gas is replenished, the exhaustion step of keeping the total gas pressure constant during the gas replenishment is provided as in the prior art (step 811).

Like the foregoing fourth and sixth embodiments, a replenishment rate GH' for the diluted halogen gas is controlled to be proportional to a rate f'(P) of the laser oscillation pulse P.

Meanwhile, in the case of the rare gas, the replenishment of the predetermined amount $\Delta GR$ of rare gas is set to be started when the command charging voltage Va exceeds the threshold value Vr for injection of the rare gas ($Vmin \leq Va \leq Vr \leq Vmax$).

Explanation will be made by referring to the flowchart of FIG. 15.

After the laser chamber 4 is charged with new gases, prior to starting the operation of the excimer laser system, the target laser output Ec, optimum control charging voltage range Vc (Vmin to Vmax), charging voltage increment/decrement $\Delta V$ by one Control, rare gas replenishment amount $\Delta GR$ by one operation, and threshold voltage Vr for injection of the rare gas are previously set (step 801).

Thereafter, when the operation of the laser is started, a laser output E detected by the laser output monitor 6, a charging voltage V detected by a charging voltage detector 24, and a laser oscillation pulse number P detected by the pulse monitor 23 are applied to the controller 1 (step 802).

The controller 1, as in the foregoing embodiment, compares the detection laser output E with the target laser output Ec (step 803). When E<Ec, the controller 1 adds the above fine voltage $\Delta V$ to the detection charging voltage V so that the voltage V becomes a command charging voltage Va (step 804); when E=Ec, the controller issues the detection charging voltage V as it is as the command charging voltage Va (step 805); and when E>Ec, the controller subtracts the above fine voltage $\Delta V$ from the detection charging voltage V so that the voltage V becomes the command charging voltage Va (step 806).

Further, the controller 1 compares the command charging voltage Va with the threshold voltage Vr for injection of the rare gas (step 807). As soon as the command charging voltage Va exceeds the threshold voltage Vr for injection of the rare gas, the controller 1 controls the on-off valve 12 to cause the predetermined amount $\Delta GR$ of Kr gas to be replenished from the gas cylinder 9 to the laser chamber 4 (step 808).

In parallel with the above, the controller 1 calculates the rate of the received laser oscillation pulse P (step 809), controls the on-off valve 17 to cause the predetermined amount $\Delta GH'$ of the diluted halogen gas F2 per unit time to be proportional to the calculated laser oscillation rate (step 810), and also refers to the detection value of the pressure monitor 5 to cause the gas to be partly exhausted from the laser chamber so that the total pressure of the laser chamber 4 is kept at a predetermined level (step 811).

The above replenishment of the halogen and rare gases may be carried out always continuously or intermittently. In other words, any control may be employed so long as the replenishment amount GH' for the diluted halogen gas F2 per unit time is set to be eventually proportional to a laser oscillation rate f'(P).

In the foregoing eighth embodiment, the replenishment of the rare gas is carried out by such an amount as to nearly compensate for the dilution caused by the replenishment of the halogen gas. However, since an increase in the charging voltage is not always constant, the dilution is not completely compensated for, but even so, when compared with the prior art control with no injection of the rare gas at all, the stability of the laser output can be remarkably improved.

Even in the present embodiment, since the replenishment amount of the rare gas component is very small, when less than 10% of diluted rare gas is used, accurate replenishment can be realized. Further, when the compensation amount of the rare gas is set to be somewhat higher to provide somewhat excessive replenishment, the above output increasing effect of the rare gas enables additional prolongation of the gas life.

Explanation will next be made as to an embodiment different in arrangement from the embodiments of FIGS. 1, 3 and 9.

Figure 20:
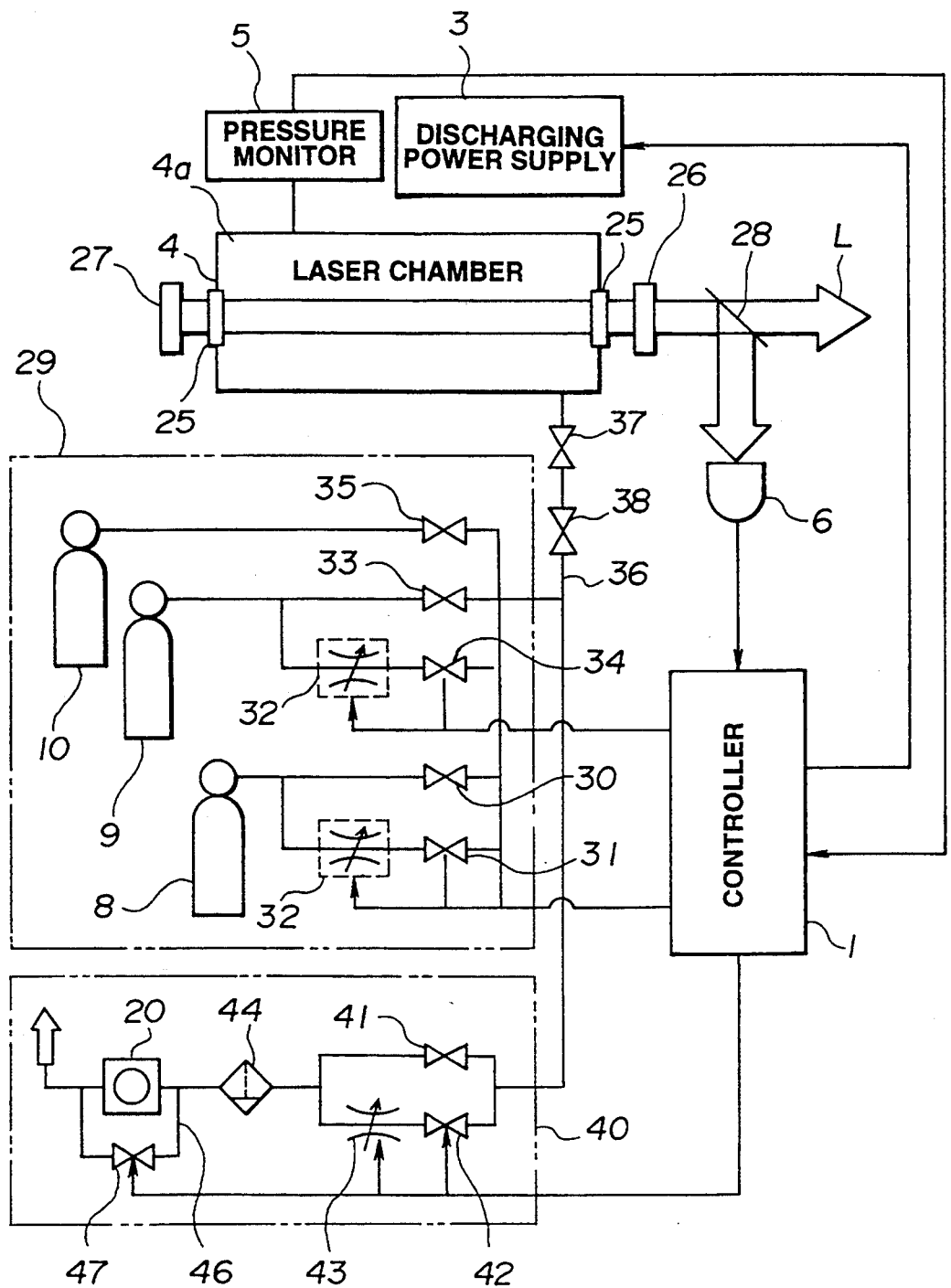
FIG. 20 is a block diagram of an arrangement of another embodiment of the present invention.

In the embodiment of FIG. 20, a laser gas chamber 4 is connected with a pressure monitor 5 for measuring the pressure of a laser gas 4a, a discharging power supply 3, a gas supply circuit 29 and a gas exhaustion circuit 40.

The laser gas chamber 4 has windows 25 mounted at its both ends. Reference numeral 26 denotes a front mirror, 27 a rear mirror, symbol L laser light, 28 a beam splitter. Disposed in front of the beam splitter 28 is an output monitor 6 which in turn is connected to a controller 1 for controlling an excimer laser system. The controller 1 is connected to the discharging power supply 3, the gas supply circuit 29 is connected to the gas exhaustion circuit 40 through a pipe line 36. Provided on the pipe line 36 are manual valves 37 and 38.

The gas supply circuit 29 has a halogen gas cylinder 8, a rare gas cylinder 9 and a buffer gas cylinder 10. The halogen gas cylinder 8 is connected to the pipe line 36 through a halogen gas injection valve 30, in parallel with which a halogen gas control valve 31 and a mass flow controller 32 are connected. The rare gas cylinder 9 is connected to the pipe line 36 through a rare gas injection valve 33, in parallel with which a rare gas control valve 34 and the mass flow controller 32 are connected. The buffer gas cylinder 10 is connected to the pipe line 36 through a buffer gas injection valve 35.

The gas exhaustion circuit 40 is connected at its one end to the pipe line 36 and at the other end to atmosphere through an exhaustion valve 41, an exhaustion control valve 42 and an orifice 43 provided in parallel with the valve 41, a halogen removal filter 44 and a vacuum pump 20. Connected in parallel to the vacuum pump 20 is a bypass valve 47 provided on a bypass line 46. The gas supply circuit 29 and the gas exhaustion circuit 40 are both also connected to valves other than the manual valves 37 and 38 and the mass flow controller 32 is connected to the controller 1 so as to be operated by control signals from the controller 1. The above valves may be of an electrically or pneumatically operated type. The manual valves 37 and 38 are normally opened.

Although not illustrated in the foregoing embodiment, such members placed in low temperature (room temperature plus several tens of degrees) atmosphere as a filter, a fan and a heat exchange in contact with halogen gas are made of corrosion resistive material.

The operation of the system will then be explained below. After the laser gas 4a is charged into the laser chamber 4 through the gas supply circuit 29, the discharging power supply 3 causes discharging to take place in the laser gas between electrodes (not shown) to thereby excite the laser gas. Caused in the excited gas is laser oscillation by a resonator comprising the windows 25 for extraction of the laser light and the front and rear mirrors 26 and 27. The laser light L emitted from the window 25 is partly extracted by the beam splitter 28 so that the extracted partial light is directed to the output monitor 6 and the other light is passed through the beam splitter to be used for processing and measurement. An electrical signal obtained from the output monitor 6 is sent to the controller 1 which in turn acts to control the gas supply circuit 29, gas exhaustion circuit 40 and discharging power supply 3 on the basis of the received electrical signal to thereby stabilize the output of the laser.

A halogen gas supply system in the gas supply circuit 29 is separated from the halogen gas cylinder 8 into two channels. At the time of the initial introduction of the halogen gas, the halogen gas injection valve 30 provided in one of the two channels is opened to introduce the gas into the laser chamber 4. The halogen gas for output stabilization is supplied into the laser chamber through the halogen gas control valve 31 and mass flow controller 32 both provided in the other channel. Meanwhile, the buffer gas is supplied into the laser chamber through the buffer gas injection valve 35.

The exhaustion valve 41 in the gas exhaustion circuit 40 is used to fully exchange all the laser gas, while the exhaustion control valve 42 and orifice 43 are used to control the pressure of the laser chamber in the output stabilizing operation. The exhausted gas from the laser chamber is passed through the halogen-gas removing filter 44 and then discharged into the atmosphere. In the output stabilizing operation, the exhausted gas from the laser chamber is discharged directly from the opened bypass valve 47 without any intervention of the vacuum pump 20.

EMBODIMENT 9

A ninth embodiment using the above-mentioned apparatus will be explained. In this connection, it is effective that control over a change in a short period of time (in seconds and minutes) in the laser output and over a reduction in a long period of time (in tens of hours) caused by generation of impurities (such as $CF_4$ and HF) is carried out by controlling the charging voltage supplied from the discharging power supply 3, while the output control throughout an intermediate period of time (in several hours) and a long period of time is effectively carried out by controlling the injection of the halogen gas.

After a predetermined pressure of the laser gas 4a is injected into the laser chamber 4, a charging voltage and an oscillation repetitive number corresponding to a predetermined laser output are set by the controller 1. When the oscillation of the laser is started, the above setting of the charging voltage and oscillation repetitive number is finely adjusted; while when the laser output enters into a predetermined allowable range, the laser is put in its output control mode. The laser output is judged by the controller 1 on the basis of an output signal received from the output monitor 6.

Figure 22:
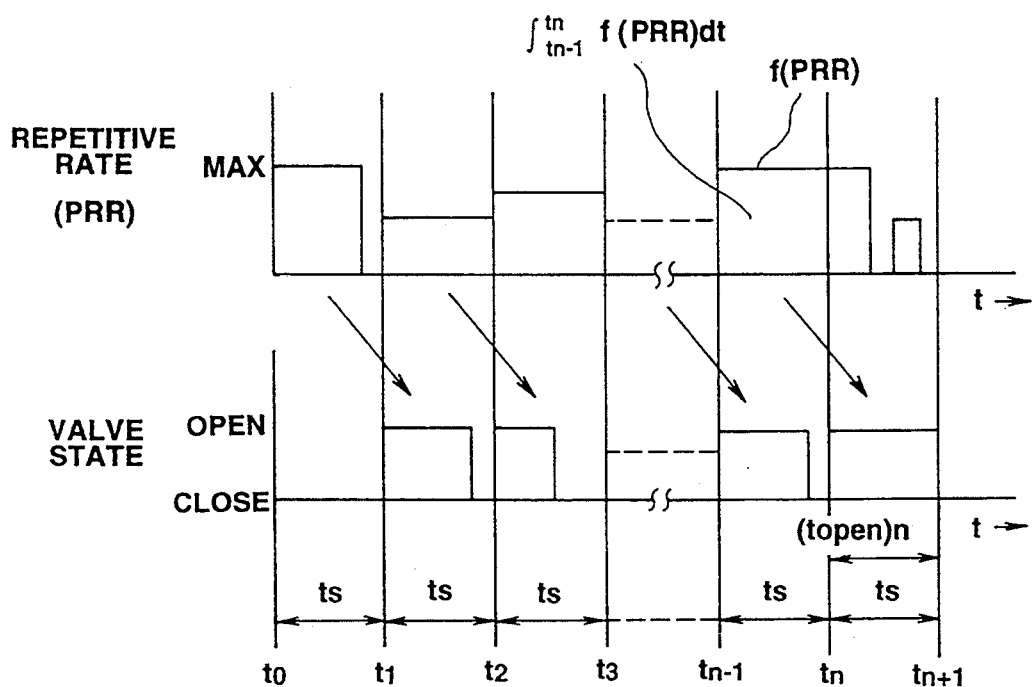
FIG. 22 is a diagram for explaining how to control the halogen gas injection.

Control of the injection amount of halogen gas is carried out as shown in FIG. 22. Normally, a pulse number Np oscillated during a predetermined time period $t_s$ ($=t_1-t_0$) is first found in accordance with the following equation (1) and counted in the controller 1.

$$Np = \int_{t_0}^{t_1} f(PRR) \, dt \quad (1)$$

where, PRR represents pulse repetitive number.

The injection control is effected based on this data during the next time interval $t_s$ ($=t_2-t_1$). The mass flow controller 32 is previously set so that a constant flow rate is passed through the controller 32. Control of the injection amount is realized with use of the mass flow controller 32 or when the supply pressure of the halogen gas cylinder 8 can be kept constant, with use of an orifice. This set flow rate is previously set so that, when the laser is continuously oscillated at a maximum repetitive rate PRRmax, even continuous injection enables the decreased amount to be compensated for. In this connection, an open time $t_{open}$ of the halogen gas control valve 31 during the time interval $t_s$ ($=t_2-t_1$) is set in accordance with the following equations, where R in the equation (2) is represented by the equations (3) and (4).

$$t_{open} = R \, t_s$$

$$R = \int_{t_{n-1}}^{t_n} f(PRR) \, dt / PRR\max \, t_s \quad (3)$$

$$R = \text{Pulse number oscillated in } t_s / \text{Maxim pulse number oscillatable in } t_s \quad (4)$$

Figure 21:
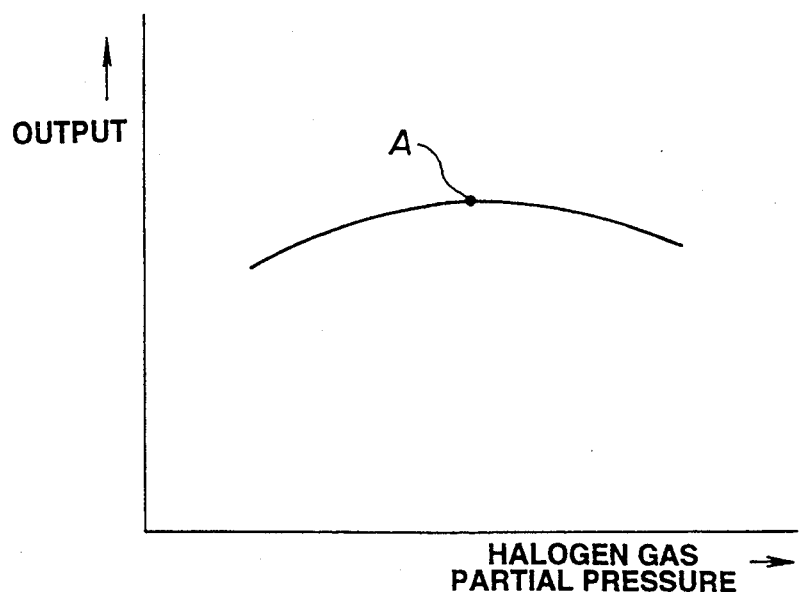
FIG. 21 is a graph showing a relationship between the laser output and halogen gas partial pressure.

In this control, the injection of the halogen gas is delayed by $t_s$, but when $t_s$ is set to be sufficiently smaller than the decrease rate of the halogen gas, the halogen partial pressure is within the allowable range, which will involve no practical problems. In the case of an excimer laser, it is relatively easy to set a relationship between the halogen gas partial pressure and output as shown by a graph in FIG. 21. In the case where such a relationship is obtained, when an operation start point is set at a point A in the graph, a somewhat variation in the halogen gas partial pressure can be allowable. In the present invention, the time $t_s$ is set to be about 10 minutes, in which case the gas control can be realized without any problems.

Further, since halogen gas is high reactive, handling of it must be careful. For this reason, the halogen gas is usually diluted into 1 to 10% with buffer gas. Thus, when the halogen gas is injected, the buffer gas is also injected at the same time, which results in increase in the pressure of the laser chamber. In order to avoid this, in accordance with the present embodiment, the pressure of the laser chamber 4 is monitored by the pressure monitor 5 so that the gas exhaustion is carried out on the basis of a difference between the pressure of the laser chamber 4 and atmosphere, whereby the pressure of the laser chamber 4 is kept constant. In the exhaustion method, in FIG. 20, the exhaustion valve 42 and the bypass valve 47 are opened so that the laser gas 4a within the laser chamber 4 can escape therefrom into atmosphere via the orifice 43. When the bypass valve 47 is opened, the gas exhaustion can be realized without the operation of the vacuum pump 20. It goes without saying that the gas exhaustion may be carried out with the vacuum pump 20 operated.

Explanation will next be made as to the operation of the foregoing ninth embodiment by referring to a flow-chart of FIG. 25.

Figure 25:
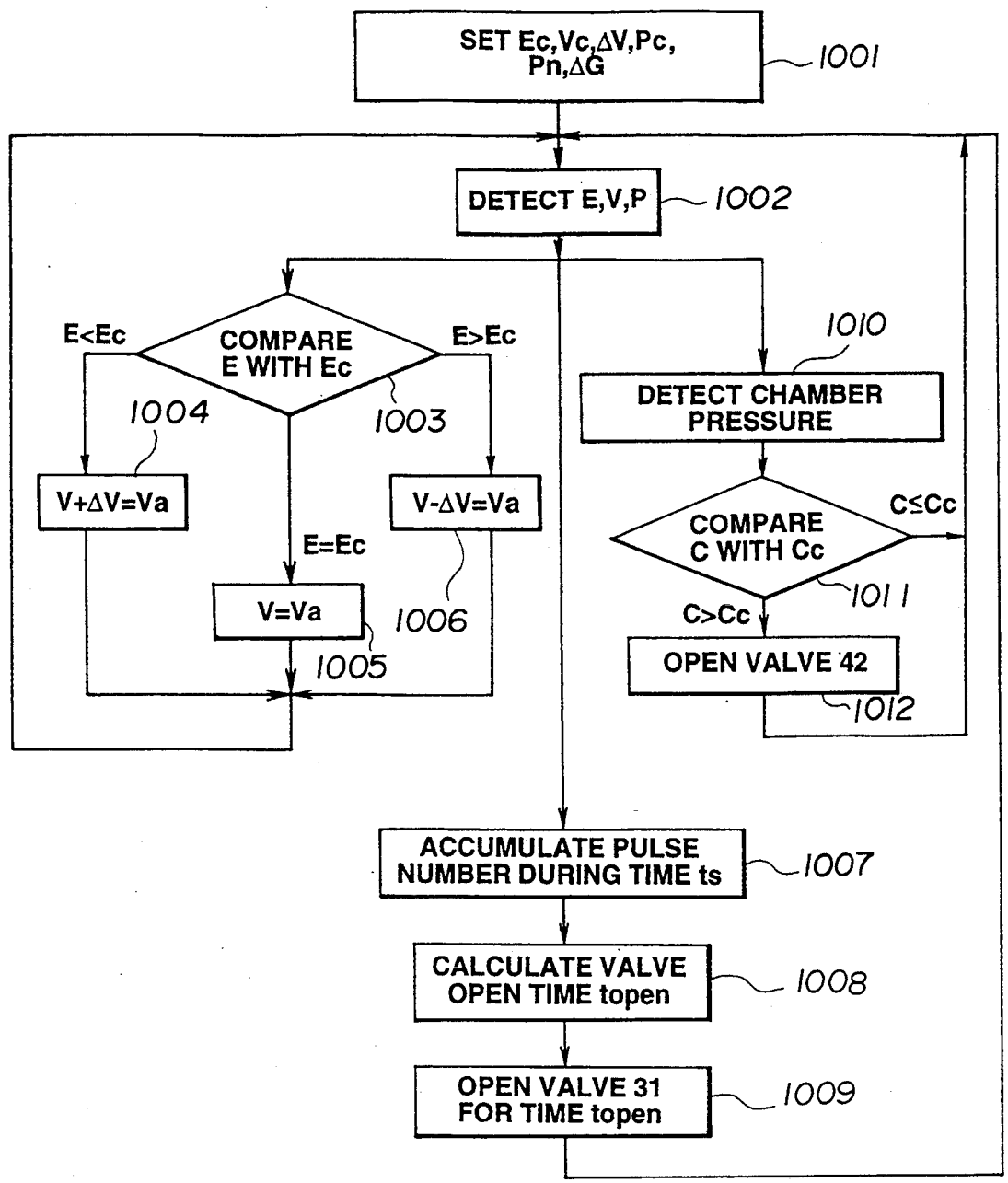
FIG. 25 is a flowchart for explaining the output control of ninth and tenth embodiments of the present invention.

In FIG. 25, reference symbol Ec denotes target laser output, Vc optimum charging voltage control range (Vmin to Vmax), $\Delta v$ fine charging voltage increment-/decrement, Pc threshold value, Pn=$\Sigma$P, $\Delta$G replenishment gas amount by one operation, E detection laser output, V detection charging voltage, P detection pulse, C chamber pressure, Cc target chamber pressure (constant), Va command charging voltage.

In a step 1001, Ec, Vc, $\Delta$V, Pc, Pn and $\Delta$G are set. In a step 1002, E, V and P are detected. Thereafter, the three operations are simultaneously carried out in parallel.

Firstly, in a step 1003, the controller 1 compares E with Ec. When E<Ec, calculation is made in a step 1004 to increase the charging voltage; when E=Ec, the charging voltage is not changed in a step 1005; and when E>Ec, calculation is made in a step 1006 to decrease the charging voltage, thereby obtaining a command charging voltage Va. A command indicative of the command charging voltage Va is issued to the discharging power supply 3 to change the current charging voltage and stabilize the output. Subsequently, control goes again to the step 1002. At this time, the value of Va satisfies a relationship Vmin≦Va≦Vmax.

Secondly, the controller 1 accumulates the number of pulses during the time $t_s$ in a step 1007, calculates a valve open time $t_{open}$ in a step 1008, and opens the halogen gas control valve 31 for the time $t_{open}$ in a step 1009 to replenish the halogen gas thereby stabilizing the output. Subsequent to the step 1009, control goes again to the step 1002.

Thirdly, the pressure monitor 5 detects the pressure of the laser chamber 4 as a detection pressure signal in a step 1010 and sends the signal to the controller 1. The controller 1, when receiving the signal from the pressure monitor 5, compares C with Cc in a step 1011. When C>Cc, the controller 1 issues a control signal to the exhaustion control valve 42 in a step 1012 to cause the valve 42 to be opened so that pressure adjustment is carried out to stabilize the output. Subsequent to the step 1012, control goes to the step 1002. When C≦Cc, control goes again to the step 1002.

EMBODIMENT 10

Figure 23:
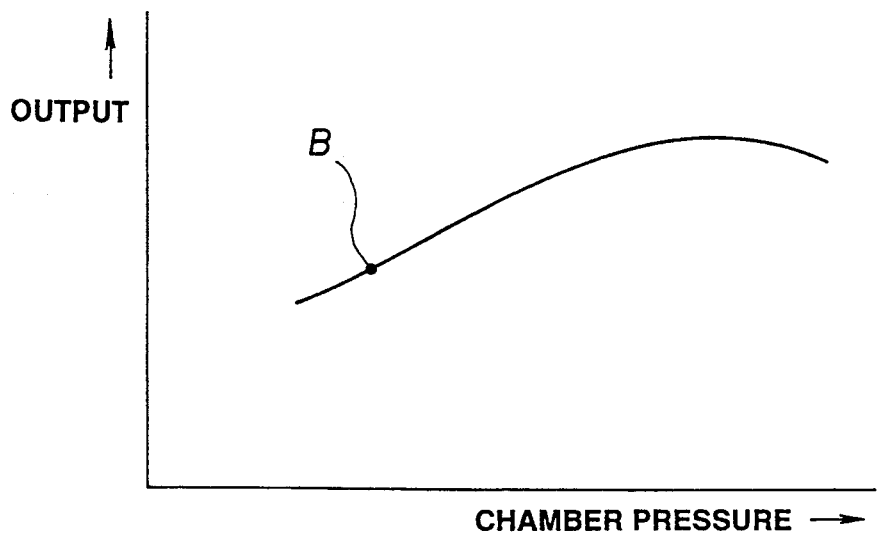
FIG. 23 is a graph showing a relationship between the laser output and chamber pressure.

A tenth embodiment of the present invention will then be explained. In a method of controlling stabilization of an output of the tenth embodiment, the internal pressure of the laser chamber 4 is gradually increased to stabilize the output, whereas the internal pressure of the laser chamber 4 is kept constant in the foregoing first embodiment. In an excimer laser, when the partial pressure of the rate gas is equal to the partial pressure of the halogen gas, there may be a case that the higher the partial pressure of the buffer gas or the pressure of the laser chamber is the higher the laser output is as shown in FIG. 23 (a point B denoting an operation start point in the drawing). With the laser operated under this condition, when the pressure of the laser chamber is controlled to be gradually increased utilizing the pressure increase caused by the injection of the halogen gas, such an output reduction caused by the increase of impurities that cannot be compensated for only by the injection of the halogen gas can be suppressed.

The above operation will be detailed by referring to the flowchart of the ninth embodiment of FIG. 25. In the flowchart of FIG. 25, only setting of Cc is different. That is, Cc=f (ΣP) (target chamber pressure which is expressed by a total pressure increasing line with respect to a preset accumulated pulse number), and the other are the same as those in the ninth embodiment and thus the presentation of its flowchart and explanation thereof are omitted.

EMBODIMENT 11

Figure 26:
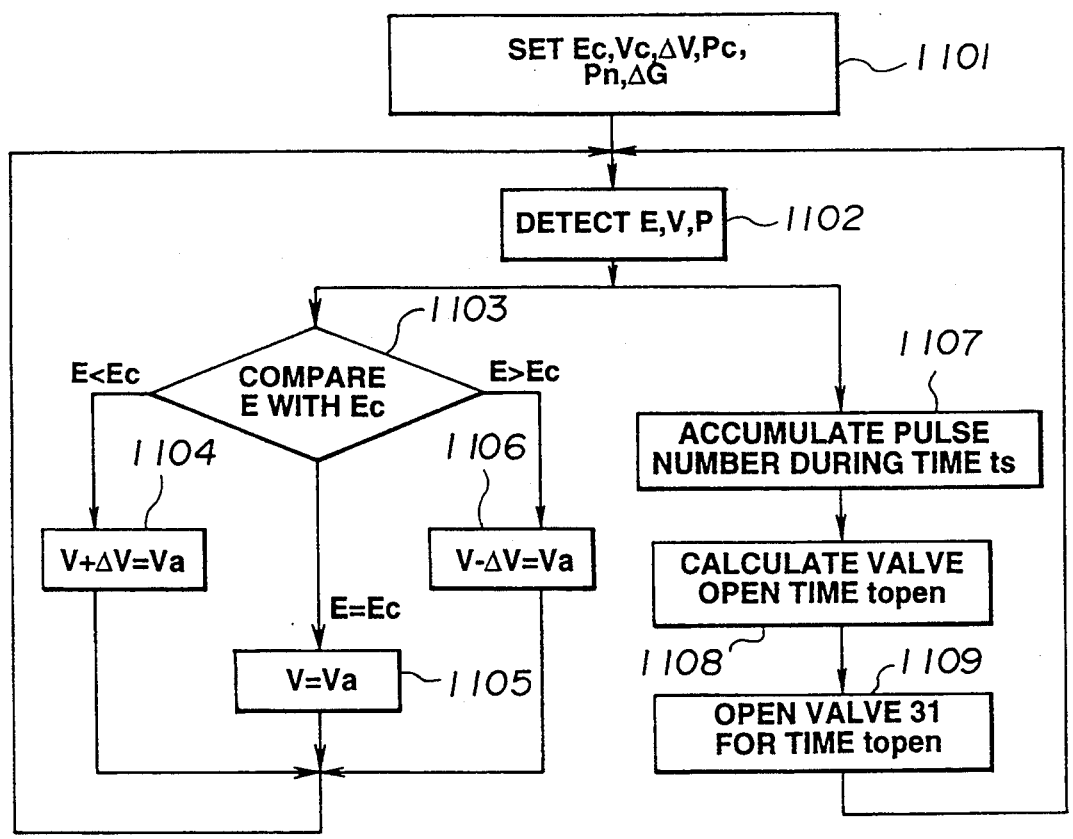
FIG. 26 is a flowchart for explaining the output control of an eleventh embodiment of the present invention when gas discharging is not carried out.

In the foregoing ninth and tenth embodiments, there is such a case that, when the laser chamber pressure and the gas composition ratio fall within an allowable range of the laser oscillation without exhausting the gas, the exhaustion may be omitted. In this case, since the partial pressure of the rare gas will not vary, the partial pressure ratio between the rare and halogen gases will also not vary. Accordingly, as shown by a flowchart of FIG. 26, the control of the chamber pressure is not required. In FIG. 26, steps 1101 to 1109 are the same as the step 1001 to 1009 in the flowchart of FIG. 25 of the ninth embodiment, and thus explanation thereof is omitted.

Figure 24:
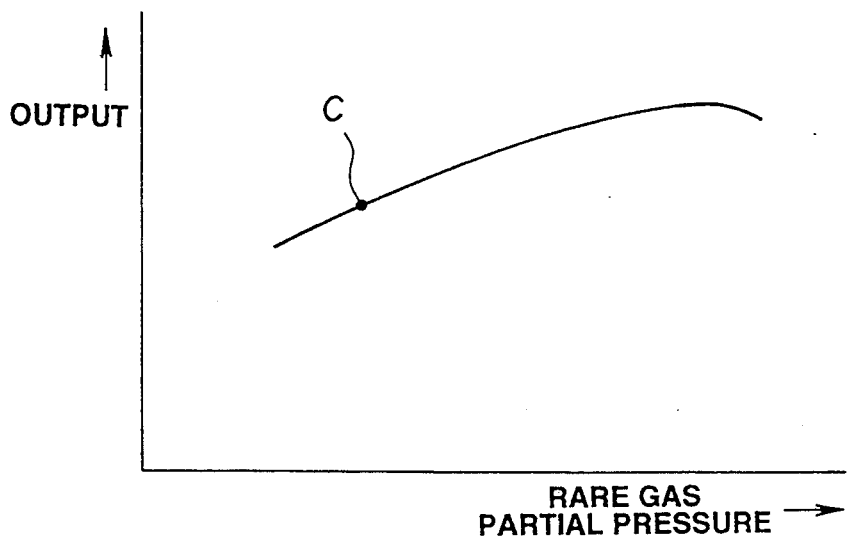
FIG. 24 is a graph showing a relationship between the laser output and rare gas partial pressure.

In the case where it is desired to keep the pressure of the laser chamber constant or to gradually increase it, when it is necessary to exhaust the laser gas, the exhaustion also involves exhaustion of the rare and halogen gases. Although the injection amount of the halogen gas can be corrected, the partial pressure of the rare gas is merely decreased. Since the decrease of the rare gas is much smaller than that of the halogen gas, a certain level of the gas life can be obtained without any correction. However, when it is desirable to further prolong the gas life, it is necessary to also inject the rare gas to correct the partial pressure of the rare gas. This method is valid when a relationship between the partial pressure of the rare gas and the laser output is such as shown by a graph in FIG. 24. In the drawing, a point C denotes an operation start point. In general, since the output of a laser system becomes larger than its stabilized output, the gas composition is set, in many applications, to be thinner than the level providing the maximum output. Thus, this method is valid in many cases.

With regard to how to inject the rare gas, since the injection amount of the rare gas is much smaller than that of the halogen gas (about 1/20 to 1/50 in the present embodiment), it is only required to inject the rare gas at intervals of a certain time. Of course, the rare gas injection may be carried out in the similar manner to the halogen gas, in which case the flow rate of the rare gas is very small, making it hard to control it. It is however practically unnecessary to control the rare gas in the same manner as the halogen gas. As methods of injecting the rare gas, there are two methods one of which is carried out with use of the mass flow controller 32 in the same manner as the halogen gas and the other is carried out by opening and closing the rare gas control valve 34 while monitoring the pressure of the laser chamber. In either case, consideration must be paid so as to avoid such a situation that an abrupt change in the partial pressure of the rare gas disables the stabilizing control of the laser output, as a matter of course.

EMBODIMENT 12

Figure 27:
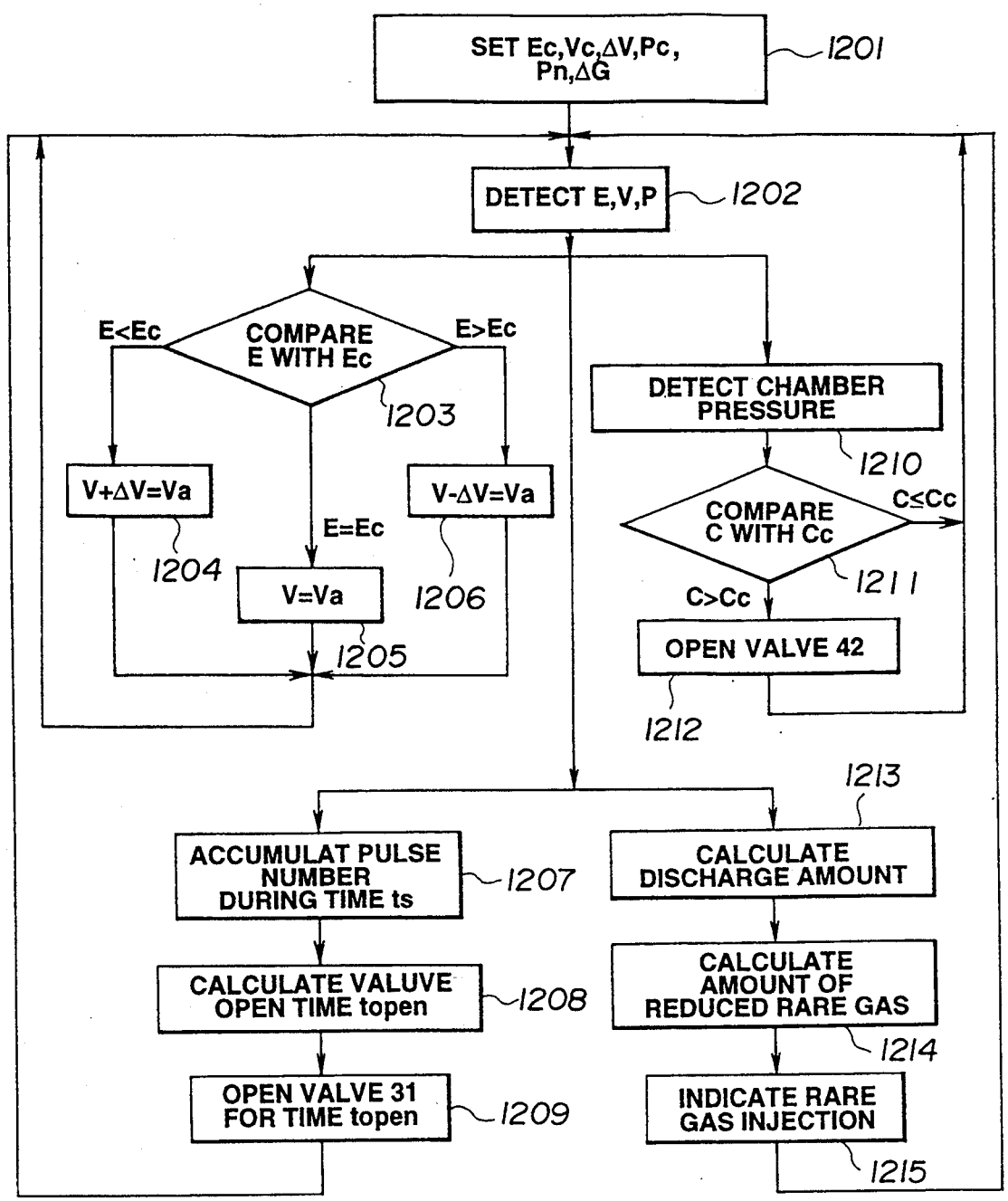
FIG. 27 is a flowchart for explaining the output control of a twelfth embodiment of the present invention when injection of a rare gas is carried out in parallel with gas pressure control on the basis of a gas discharge amount.

There are two methods of calculating the injection amount of rare gas, i.e., one for calculating it on the basis of the discharge amount of laser gas and the other for finding it on the basis of the pulse number similarly to the halogen gas. The operation when the rare gas injection amount is calculated on the basis of the discharge amount of the laser gas is shown by a flowchart in FIG. 27. In FIG. 27, Cc=f (ΣP) as in the tenth embodiment. After E, V and P are detected in a step 1202, four operations of the control of the charging voltage, the control of the injection amount of halogen gas, the pressure control required by the exhaustion of the laser gas, and the control of the injection amount of rare gas are simultaneously carried out in parallel. Steps 1203 to 1212 are the same as the steps 1003 to 1012 of the ninth embodiment and thus explanation thereof is omitted. The controller 1 calculates the discharge amount of laser gas in step 1213, calculates the reduced amount of rare gas in a step 1214, and gives an instruction indicative of the injection of rare gas in a step 1215.

EMBODIMENT 13

Figure 28:
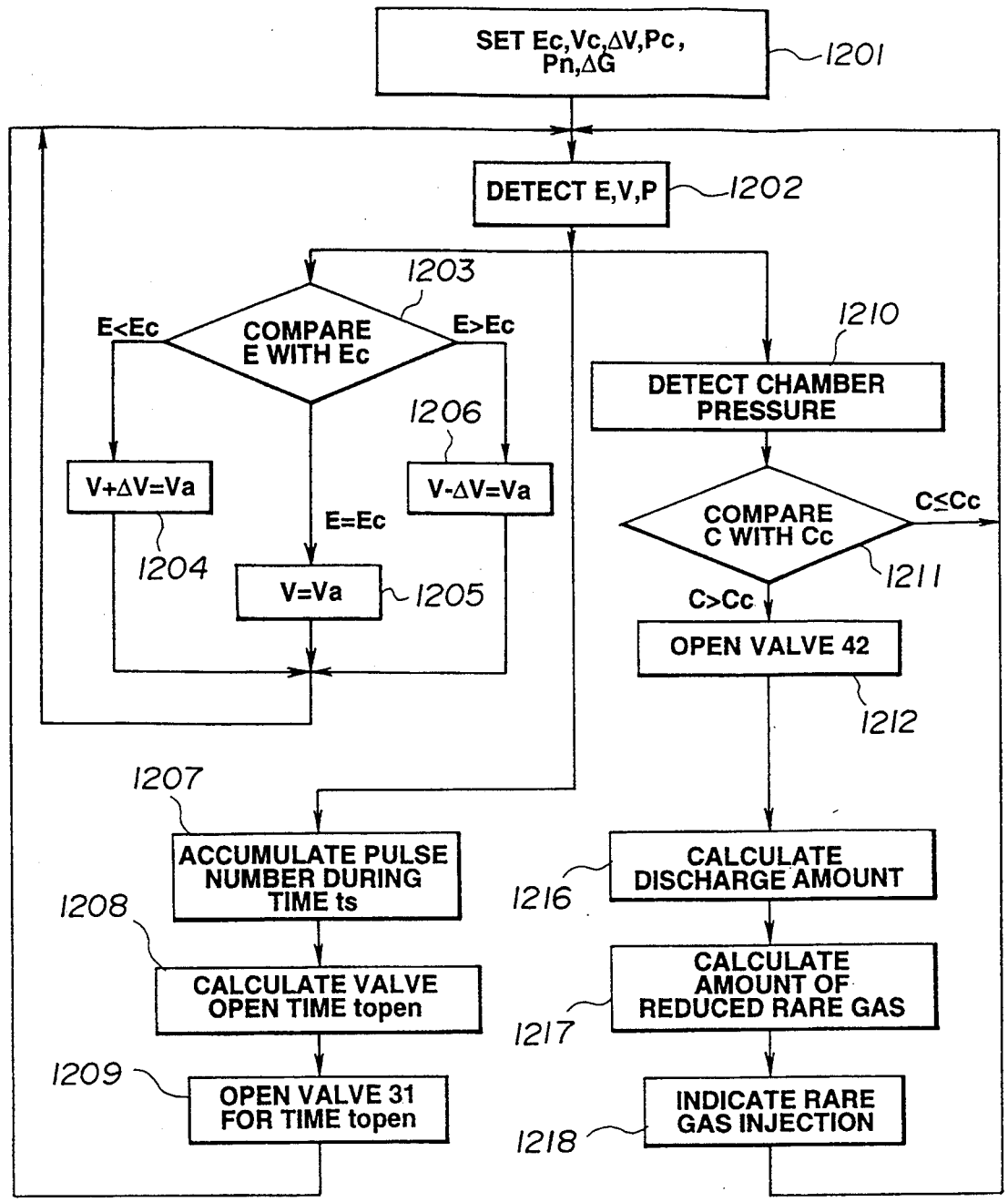
FIG. 28 is a flowchart for explaining the output control of a thirteenth embodiment of the present invention when injection of a rare gas is carried out serially with gas pressure control on the basis of a gas discharge amount.

FIG. 28 shows a flowchart for explaining how to control the pressure of the laser chamber, in which the controller opens the exhaustion control valve 42 for gas exhaustion in a step 1212, calculates the reduced amount of rare gas in a step 1217, and gives an instruction indicative of the injection of rare gas in a step 1218. Other operations are the same as that of the flowchart of FIG. 27 and thus explanation thereof is omitted.

EMBODIMENT 14

Figure 29:
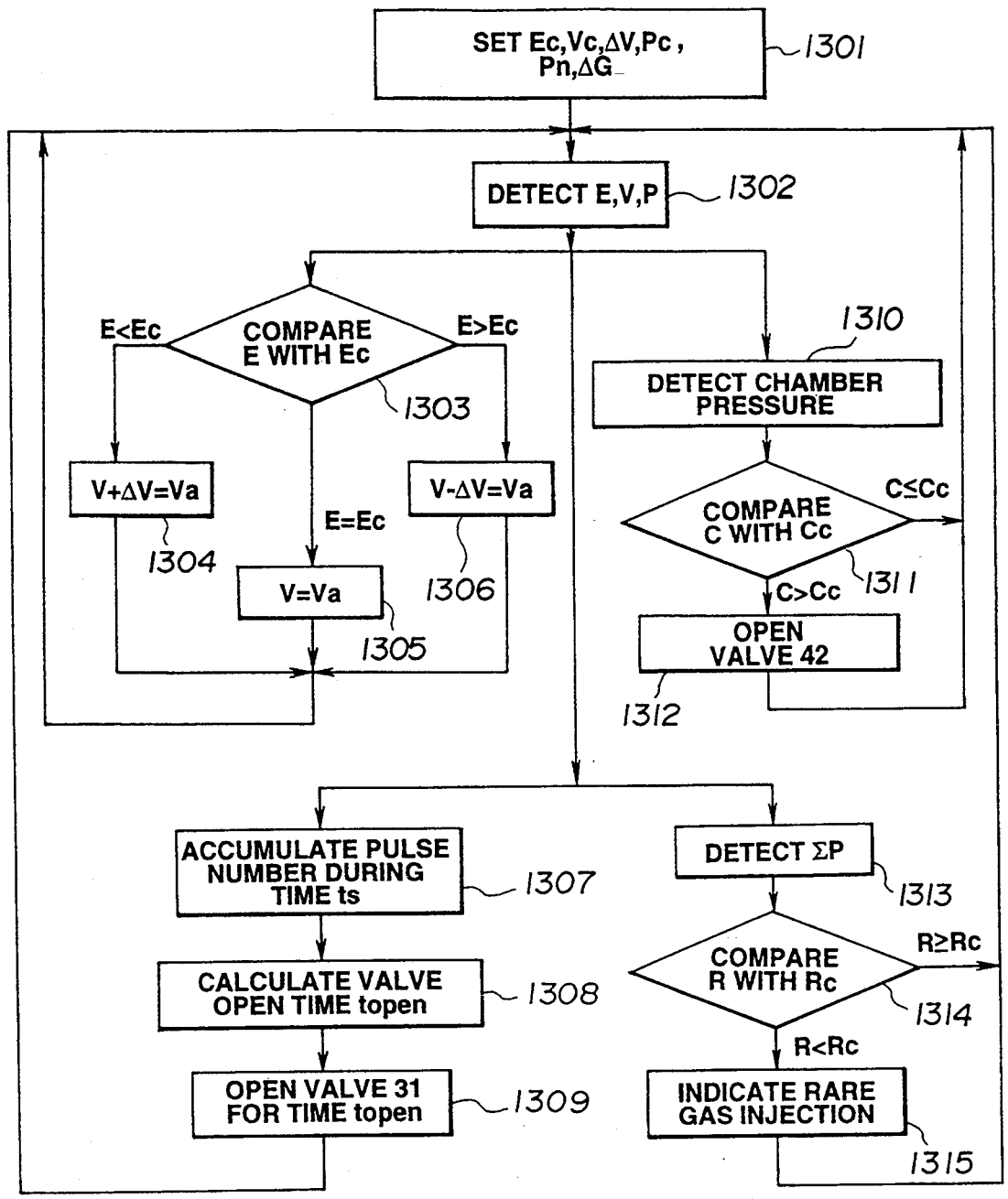
FIG. 29 is a flowchart for explaining the output control of a fourteenth embodiment of the present invention when injection of a rare gas is carried out on the basis of the number of oscillation pulses.

A flowchart of FIG. 29 shows the operation when the injection amount of rare gas is found on the basis of the number of pulses. In the drawing, reference symbol R denotes the partial pressure of rare gas and $Rc=f(\Sigma P)$ (target rare gas partial pressure). Steps 1301 to 1312 are the same as the corresponding ones in the foregoing flowchart. The number of pulses is detected in a step 1313, R is compared with Rc in a step 1314. When $R<Rc$, the controller gives an instruction indicative of the injection of rare gas in a step 1315 and when $R \geq Rc$, control returns to the step 1302.

EMBODIMENT 15

Figure 30:
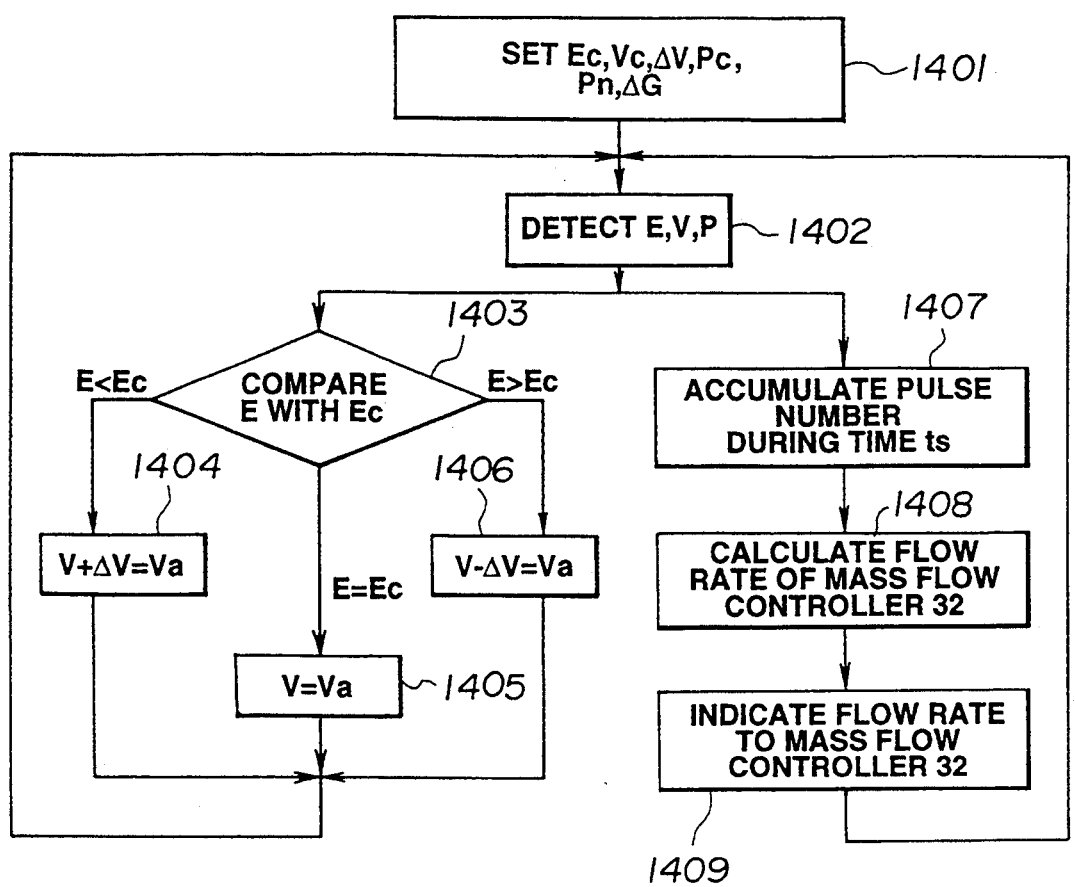
FIG. 30 is a flowchart for explaining the output control of a fifteenth embodiment of the present invention.

In a fifteenth embodiment of the present invention, control of the injection amount of halogen gas is carried out not by opening and closing the halogen gas control valve 31 but by changing the set flow rate of the mass flow controller 32. This operation is shown by a flowchart in FIG. 30, in which steps 1401 to 1406 are the same as the corresponding ones in the flowcharts of other embodiments. The number of pulses during the time $t_s$ is accumulated in a step 1407, a flow rate to be passed through the mass flow controller 32 is calculated in a step 1408, and an instruction indicative of the flow rate is sent in a step 1409 to the mass flow controller 32 to supply the halogen gas. It goes without saying that the control of the injection amount of halogen gas may be carried out by means of a combination of the above method of opening and closing the halogen gas control valve 31 and the above method of controlling the flow rate of the mass flow controller 32.

As has been disclosed in the foregoing, in accordance with the present invention, since a spectrum width is detected and the gas replenishment amount is controlled based on the detected result so that the spectrum width becomes constant, fluctuations in the spectrum width resulting from variations in the gas composition can be suppressed and thus the spectrum width can be stably set to be constant.

In accordance with the present invention, further, since the gas exhaustion step of keeping the total gas pressure of the laser chamber constant is omitted, the total gas pressure is increased but reduction in the laser output caused by the dilution of the rare gas component per unit volume can be made small, whereby, even when the gas replenishment is carried out for a number of times, the optimum gas composition balance sis not easily destroyed and reduction in the laser output can be suppressed for a long term of time.

Furthermore, since the replenishment amount of halogen gas is found according to the count value of the oscillation pulse number, even when the decreasing rate of the halogen gas is unstable, reliable replenishment can be realized.

In this way, in accordance with the present invention, the output of the laser system can be stabilized at all times.

What is claimed is:

1. A laser gas replenishing apparatus in an excimer laser system wherein various sorts of laser gases including a halogen gas are sealed within a laser chamber and excited by discharging within the laser chamber so as to output a laser oscillation light having a desired spectrum width, the apparatus comprising:

a halogen gas control valve provided in a halogen gas supply line for supplying the halogen gas from a halogen gas supply source, for changing a replenishment amount of the halogen gas replenished from the halogen gas supply source into the laser chamber;

detecting means for detecting a spectrum width of the laser oscillation light; and control means for calculating the replenishment amount of the halogen gas so as to increase the replenishing amount of the halogen gas when the spectrum width detected by the detecting means is smaller than the desired spectrum width and decrease the replenishment amount of the halogen gas when the detected spectrum width is greater than the desired spectrum width, and controlling the halogen gas control valve so that the calculated replenishment amount of the halogen gas is replenished into the laser chamber.

2. A laser gas replenishment apparatus in an excimer laser system as set forth in claim 1, further comprising a gas supply control valve provided in a gas supply line for supplying the laser gas into the laser chamber from a laser gas supply source other than the halogen gas supply source, for controlling a supply amount of the laser gas supplied to the laser chamber, and a gas exhaustion control valve provided in a gas exhaustion path for exhausting the laser gas from the laser chamber, for changing an exhaustion amount of the laser gas exhausted from the laser chamber, wherein the control means controls the gas supply control valve, the halogen gas control valve and the gas exhaustion control valve so that the laser gas sealed within the laser chamber is exhausted and a new laser gas is supplied, accumulates the number of oscillation pulses from a time point when the new laser gas is sealed within the laser chamber by the gas exchange, controls the halogen gas control valve so that when the accumulated number of the oscillation pulses reaches a predetermined threshold value, the halogen gas is replenished into the laser chamber with a predetermined amount corresponding to the predetermined threshold value, and wherein the control means calculates the replenishment amount of the halogen gas so as to increase the predetermined amount when the spectrum width detected by the detecting means is smaller than the desired spectrum width and decrease the predetermined amount when the detected spectrum width is greater than the desired spectrum width, and controls the halogen gas control valve so that the calculated amount of the halogen gas is replenished into the laser chamber.

3. A laser gas replenishment apparatus in an excimer laser system as set forth in claim 1, further comprising a tank having a predetermined capacity provided in the halogen gas supply line, wherein the control means, after a predetermined amount of halogen gas is charged into the tank from the halogen gas supply source, performs a predetermined number of times of halogen gas replenishment corresponding to the calculated replenishment amount of the halogen gas from the tank into the laser chamber through the halogen gas supply line to thereby replenish the predetermined amount of the halogen gas.

4. A laser gas replenishment apparatus in an excimer laser system as set forth in claim 1, wherein the control means counts the number of laser oscillation pulses, calculates an oscillation frequency per unit time based on a result of counting and changes the replenishment amount of the halogen gas in proportion to the oscillation frequency per unit time.

5. A laser gas replenishment apparatus in an excimer laser system as set forth in claim 4, further comprising a constant flow rate control valve and an on-off valve both being provided in the halogen gas supply line, wherein the control means controls the on-off valve to put it in its open state and put it in its closed state after a predetermined period of time has passed so as to allow the halogen gas to pass through only during the predetermined period of time, and controls the constant flow rate valve to allow the halogen gas with a flow rate proportional to the calculated oscillation frequency per unit time to pass through the halogen gas supply line during the predetermined period of time to thereby change the replenishment amount of the halogen gas.

6. A laser gas replenishment apparatus in an excimer laser system as set forth in claim 4 further comprising a constant flow rate control valve and an on-off valve both being provided in the halogen gas supply line, wherein the control means controls the on-off valve to put it in its open state and put it in its closed state after a period of time proportional to the calculated oscillation frequency per unit time has passed so as to allow the halogen gas to pass through only during said period of time, and controls the constant flow rate valve to allow the halogen gas with a predetermined flow rate to pass through the halogen gas supply line within said period of time to thereby change the replenishment amount of the halogen gas.

7. A laser gas replenishment method in an excimer laser system, comprising the steps of:
- injecting laser gases including a diluted halogen gas diluted with a buffer gas, a rare gas and the buffer gas into a laser chamber until an entire inner gas pressure of the laser chamber reaches a predetermined pressure;
- starting laser oscillation in the laser chamber;
- replenishing a predetermined amount of the diluted halogen gas into the laser chamber at a predetermined time point within a period while the laser oscillation is being carried out; and
- exhausting the laser gas from the laser chamber so as to maintain the entire inner gas pressure of the laser chamber at the predetermined pressure while the replenishment of the halogen gas is being carried out,
- wherein the step of exhausting the laser gas is omitted at the time of replenishing the halogen gas diluted with the buffer gas.

8. A laser gas replenishment method in an excimer laser system, comprising the steps of:
- injecting laser gases including a diluted halogen gas diluted with a buffer gas, a rare gas and the buffer gas into a laser chamber until an entire inner gas pressure of the laser chamber reaches a predetermined pressure;
- starting laser oscillation in the laser chamber;
- counting the number of laser oscillation pulses from a time when the laser oscillation is started; and
- replenishing a predetermined amount of diluted halogen gas at a time point when the count value of the number of laser oscillation pulses exceeded a predetermined threshold value.

9. A laser gas replenishment method in an excimer laser system, comprising the steps of:
- injecting laser gases including a diluted halogen gas diluted with a buffer gas, a rare gas and the buffer gas into a laser chamber until an entire inner gas pressure of the laser chamber reaches a predetermined pressure;
- starting laser oscillation in the laser chamber;
- counting the number of laser oscillation pulses from a time when the laser oscillation is started and calculating a count value per unit time as an oscillation speed of the laser oscillation pulses; and
- replenishing a predetermined amount of the diluted halogen gas at a time point within a period while the laser oscillation is being carried out so that the replenishment amount of diluted halogen gas per unit time is made proportional to the calculated oscillation speed.

10. A laser gas replenishment method in an excimer laser system, comprising the steps of:
- injecting laser gases including a diluted halogen gas diluted with a buffer gas, a rare gas and the buffer gas into a laser chamber until an entire inner gas pressure of the laser chamber reaches a predetermined pressure;
- starting laser oscillation in the laser chamber;
- replenishment a predetermined amount of the diluted halogen gas into the laser chamber at a predetermined time point within a period while the laser oscillation is being carried out;
- replenishing a predetermined amount of the rare gas into the laser chamber at a predetermined time point within a period while the laser oscillation is being carried out; and
- exhausting the laser gas from the laser chamber so as to maintain the entire inner gas pressure of the laser chamber at the predetermined pressure while the replenishment of the diluted halogen gas or the rare gas is being carried out.

11. A laser gas replenishment method in an excimer laser system, comprising the steps of:
- injecting laser gases including a diluted halogen gas diluted with a buffer gas, a rare gas and the buffer gas into a laser chamber until an entire inner gas pressure of the laser chamber reaches a predetermined pressure;
- starting laser oscillation in the laser chamber;
- counting the number of laser oscillation pulses from a time when the laser oscillation is started;
- replenishing a predetermined amount of the diluted halogen gas at a time point when the count value of the number of laser oscillation pulses exceeded a first threshold value previously set for diluted gas replenishment;
- replenishing a predetermined amount of the rare gas into the laser chamber at a time point when the count value of the number of laser oscillation pulses exceeded a second threshold value previously set for rare gas replenishment; and
- exhausting the laser gas from the laser chamber so as to maintain the entire inner gas pressure of the laser chamber at the predetermined pressure while the replenishment of the diluted halogen gas or the rare gas is being carried out.

12. A laser gas replenishment method in an excimer laser system, comprising the steps of:

injecting laser gases including a diluted halogen gas diluted with a buffer gas, a rare gas and the buffer gas into a laser chamber until an entire inner gas pressure of the laser chamber reaches a predetermined pressure;

starting laser oscillation in the laser chamber;

counting the number of laser oscillation pulses from a time when the laser oscillation is started and calculating a count value per unit time as an oscillation speed of the laser oscillation pulses;

replenishing a predetermined amount of the diluted halogen gas at a predetermined time point within a period while the laser oscillation is being carried out so that the replenishment amount of diluted halogen gas per unit time is made proportional to the calculated oscillation speed;

replenishing a predetermined amount of the rare gas at a predetermined time point within a period while the laser oscillation is being carried out so that the replenishment amount of the rare gas per unit time is made proportional to the calculated oscillation speed; and exhausting the laser gas from the laser chamber so as to maintain the entire inner gas pressure of the laser chamber at the predetermined pressure while the replenishment of the diluted halogen gas or the rare gas is being carried out.

13. A laser gas replenishment method in an excimer laser system, comprising the steps of:

injecting laser gases including a diluted halogen gas diluted with a buffer gas, a rare gas and the buffer gas into a laser chamber until an entire inner gas pressure of the laser chamber reaches a predetermined pressure;

starting laser oscillation in the laser chamber;

counting the number of laser oscillation pulses from a time when the laser oscillation is started;

detecting a charging voltage for controlling a laser output from the time when the laser oscillation is started;

replenishing a predetermined amount of the diluted halogen gas at a time point when the count value of the number of laser oscillation pulses exceeded a first threshold value previously set for the diluted gas replenishment;

replenishing a predetermined amount of the rare gas at a time point when the detected charging voltage exceeded a second threshold value previously set for the rare gas replenishment; and exhausting the laser gas from the laser chamber so as to maintain the entire inner gas pressure of the laser chamber at the predetermined pressure while the replenishment of the diluted halogen gas or the rare gas is being carried out.

14. A laser gas replenishment method in an excimer laser system, comprising the steps of:

injecting laser gases including a diluted halogen gas diluted with a buffer gas, a rare gas and the buffer gas into a laser chamber until an entire inner gas pressure of the laser chamber reaches a predetermined pressure;

starting laser oscillation in the laser chamber;

counting the number of laser oscillation pulses from a time when the laser oscillation is started and calculating a count value per unit time as an oscillation speed of the laser oscillation pulse;

detecting a charging voltage for controlling a laser output from the time when the laser oscillation is started;

replenishing a predetermined amount of the diluted halogen gas at a predetermined time point within a period while the laser oscillation is being carried out so that the replenishment amount of the diluted halogen gas per unit time is made proportional to the calculated oscillation speed;

replenishing the rare gas at a time point when the detected charging voltage exceeded a threshold value previously set for the rare gas replenishment; and exhausting the laser gas from the laser chamber so as to maintain the entire inner gas pressure of the laser chamber at the predetermined pressure while the replenishment of the diluted halogen gas or the rare gas is being carried out.

15. A laser gas replenishment method in an excimer laser system, wherein a halogen gas, a rare gas and a buffer gas are injected into a laser chamber to carry out laser oscillation, the method comprising the steps of:

counting the number of laser oscillation pulses within a first predetermined time while the laser oscillation is being carried out; and replenishing within a second predetermined time successive to the first predetermined time the halogen gas with an amount corresponding to the number of laser oscillation pulses counted within the first predetermined time.

16. A laser gas replenishment method in an excimer laser system as set forth in claim 15, wherein the replenishment of the halogen gas is carried out by making constant the replenishment amount per unit time and by changing a replenishment time within the second predetermined time in accordance with the number of laser oscillation pulses counted within the first predetermined time.

17. A laser gas replenishment method in an excimer laser system as set forth in claim 16, wherein the replenishment of the halogen gas is carried out by controlling a mass flow rate.

18. A laser gas replenishment method in an excimer laser system as set forth in claim 15, wherein the replenishment of the halogen gas is carried out by changing a replenishment amount per unit time according to the number of laser oscillation pulses counted within the first predetermined time.

19. A laser gas replenishment method in an excimer laser system as set forth in claim 18, wherein the replenishment of the halogen gas is carried out by controlling a mass flow rate.

20. A laser gas replenishment method in an excimer laser system as set forth in claim 15, wherein when the halogen gas replenishment is carried out, an exhaustion control valve for making the laser chamber to be in communication with atmosphere is opened and closed to exhaust the laser gas from the laser chamber in accordance with a pressure difference between the laser chamber and the atmosphere so as to maintain the entire inner gas pressure of the laser chamber at a preset target pressure.

21. A laser gas replenishment method in an excimer laser system as set forth in claim 20, wherein the target pressure within the laser chamber is gradually increased as the number of oscillation pulses increases.

22. A laser gas replenishment method in an excimer laser system as set forth in claim 20, wherein an exhaustion amount of the laser gas exhausted from the laser chamber is detected, an exhaustion amount of the rare gas exhausted from the laser chamber is calculated based on the detected exhaustion amount of the laser gas, and an amount of the rare gas corresponding to the calculated exhaustion amount of the rare gas is replenished.

23. A laser gas replenishment method in an excimer laser system as set forth in claim 22, wherein the replenishment of the rare gas is carried out by making constant a replenishment amount per unit time and by changing a replenishment time.

24. A laser gas replenishment method in an excimer laser system as set forth in claim 23, wherein the replenishment of the rare gas is carried out by controlling a mass flow rate.

25. A laser gas replenishment method in an excimer laser system as set forth in claim 22, wherein the replenishment of the rare gas is carried out by changing the replenishment amount per unit time.

26. A laser gas replenishment method in an excimer laser system as set forth in claim 25, wherein the replenishment of the rare gas is carried out by controlling a mass flow rate.

27. A laser gas replenishment method in an excimer laser system as set forth in claim 15, wherein within the second predetermined time an amount an amount of the rare gas corresponding to the number of laser oscillation pulses counted within the first predetermined time is replenished together with the halogen gas.

28. A laser gas replenishment method in an excimer laser system as set forth in claim 27, wherein the replenishment of the rare gas is carried out by making constant a replenishment amount per unit time and by changing a replenishment time within the second predetermined time in accordance with the number of laser oscillation pulses counted within the first predetermined time.

29. A laser gas replenishment method in an excimer laser system as set forth in claim 28, wherein the replenishment of the rare gas is carried out by controlling a mass flow rate.

30. A laser gas replenishment method in an excimer laser system as set forth in claim 27, wherein the replenishment of the rare gas is carried out by changing a replenishment amount per unit time according to the number of laser oscillation pulses counted within the first predetermined time.

31. A laser gas replenishment method in an excimer laser system as set forth in claim 30, wherein the replenishment of the rare gas is carried out by controlling a mass flow rate.

* * * * *